US012586788B2

(12) United States Patent
Zhou et al.

(10) Patent No.: US 12,586,788 B2
(45) Date of Patent: Mar. 24, 2026

(54) ZINC-CONTAINING CATHODE MATERIAL FOR SODIUM ION BATTERY AND PREPARATION METHOD AND APPLICATION THEREOF

(71) Applicant: Guizhou Zhenhua E-CHEM Inc., Guizhou City (CN)

(72) Inventors: Chaoyi Zhou, Guiyang City (CN); Qianxin Xiang, Guiyang City (CN); Jinkai Li, Guiyang City (CN); Lu Li, Guiyang City (CN)

(73) Assignee: Guizhou Zhenhua E-CHEM Inc., Guiyang City (CN)

( * ) Notice: Subject to any disclaimer, the term of this patent is extended or adjusted under 35 U.S.C. 154(b) by 578 days.

(21) Appl. No.: 18/140,988

(22) Filed: Apr. 28, 2023

(65) Prior Publication Data

US 2023/0352676 A1     Nov. 2, 2023

(30) Foreign Application Priority Data

Apr. 29, 2022     (CN) .......................... 202210474624.1

(51) Int. Cl.
*H01M 4/525* (2010.01)
*C01G 53/50* (2025.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
CPC ...... H01M 4/525; H01M 4/505; H01M 4/485; H01M 10/054; H01M 2004/021;
(Continued)

(56) References Cited

U.S. PATENT DOCUMENTS 11,196,046 B2    12/2021  Huang et al.
2015/0194672 A1    7/2015  Barker et al.

FOREIGN PATENT DOCUMENTS

CN         110061229 A     7/2019
CN         115275134 A    11/2022
(Continued)

OTHER PUBLICATIONS

Japanese Patent Application No. JP2023070547, Office Action with English translation dated May 28, 2024, 15 pages.
(Continued)

*Primary Examiner* — Eugenia Wang
(74) *Attorney, Agent, or Firm* — Cozen O'Connor

(57)     ABSTRACT

The present invention discloses a cathode material for a sodium ion battery and a preparation method and application thereof. The general chemical formula of the cathode material is $Na_{1+a}M_yZn_xO_{2+c}$, where $-0.40 \leq a \leq 0.25$, $0.1 < x \leq 0.22$, $0.78 < y \leq 0.93$, $-0.3 < c < 0.3$. M is one or a combination of two or more selected from the group consisting of Mn, Fe, Ni, Co, Al, Zr, Y, Ca, Li, Rb, Cs, W, Ce, Mo, Ba, Ti, Mg, Ta, Nb, V, Sc, Sr, B and Cu. In the powder X-ray diffraction graph, there are at least five diffraction peaks exist when $2\theta$ is $30°$-$40°$. A minor strong peak exist when $2\theta$ is around $16°$ and a major strong peak exists when $2\theta$ is around $41°$. The sodium ion cathode material of the present invention has a low residual alkali content and avoids the occurrence of gelation phenomenon in the battery slurrying process. In addition, the capacity and rate of the sodium ion battery prepared therefrom are at a relatively high level.

20 Claims, 9 Drawing Sheets

(51) Int. Cl.
  *H01M 4/505*        (2010.01)
  *H01M 10/054*      (2010.01)

(52) U.S. Cl.
  CPC ....... *H01M 10/054* (2013.01); *C01P 2002/72*
      (2013.01); *C01P 2004/61* (2013.01); *C01P*
      *2006/12* (2013.01); *C01P 2006/40* (2013.01)

(58) Field of Classification Search
  CPC .......... H01M 2004/028; C01P 2002/72; C01P
      2004/61; C01P 2006/12; C01P 2006/40;
                  C01G 53/50; Y02E 60/10
  See application file for complete search history.

(56)                References Cited

FOREIGN PATENT DOCUMENTS

| JP | 2016026981 | A | 2/2016 |
| JP | 2018026306 | A | 2/2018 |
| JP | 2020119679 | A | 8/2020 |
| WO | WO 2019003903 | A1 | 1/2019 |
| WO | WO-2020260294 | A1 * | 12/2020 | .......... H01M 10/054 |

OTHER PUBLICATIONS

Japanese Patent Application No. JP2023070547, Search Report with English translation dated Apr. 30, 2024, 29 pages.
Chinese Patent Application No. 202210474624.1, English translation of first Office Action dated Apr. 13, 2023, 12 pages.
Chinese Patent Application No. 202210474624.1, English translation of second Office Action dated Jul. 19, 2023, 12 pages.
European Patent Application No. 23169616.2, Search Opinion dated Oct. 13, 2023, 4 pages.

* cited by examiner

ZINC-CONTAINING CATHODE MATERIAL FOR SODIUM ION BATTERY AND PREPARATION METHOD AND APPLICATION THEREOF

TECHNICAL FIELD

The present invention relates to the field of sodium ion batteries and, in particular, to a cathode material for the sodium ion battery and a preparation method and application thereof.

BACKGROUND ART

Concerns about global lithium resources and the need for new scale energy storage applications have led to the continuous development of new battery areas. With the rich study experience of lithium ion batteries, sodium ion batteries have been rapidly developed. Among them, the cathode materials for sodium ion batteries mainly include layered and tunnel-type transition metal oxides, polyanion compounds, prussian blue analogues, organic materials and so on. In addition to these systems, the sodium ion batteries are also developing in the direction of low cost and practicality. The full battery performance of $NaNi_{0.5}Mn_{0.5}O_2$ was first reported by Komaba et al in Japan in 2011. In the same year, FARADION, the world's first sodium ion battery company, was established. In 2013, Goodenough etc. proposed Prussian white cathode material with high voltage and excellent rate performance. In 2014, Hu Yongsheng from China first discovered the electrochemical activity of $Cu^{3+}/Cu^{2+}$ redox couple in layered oxides, and designed and prepared a series of low-cost Cu-based cathode materials.

The positive electrode oxides of sodium ion batteries mainly include layered structure oxides and tunnel structure oxides. The tunnel structure oxides have a unique "S"-shaped channel in the crystal structure, have better rate performance and have higher stability to air and water. However, they have a lower charge-discharge specific capacity at the first cycle, resulting in a smaller specific capacity actually available. Layered oxides with periodic layered structure, simple preparation method, high specific capacity and high voltage are the main cathode materials for sodium ion batteries. However, in the preparation process of layered oxides, considering the loss of sodium element, excessive sodium salt is often added, resulting in sodium salt residue after sintering, mainly in the form of sodium carbonate and sodium hydroxide, referred to as residual alkali. This results in the surface of the cathode materials being easy to absorb water or react with air to deteriorate and have worse compatibility with the binder, which causes a decrease in the dispersion and stability of the slurry and not conducive to the subsequent coating process. In addition, surface basic compounds also increase irreversible capacity loss, deteriorating cycle performance. Furthermore, in the prior art, the layered oxides are mainly cobalt-based, manganese-based, nickel-iron-manganese-based or nickel-iron-copper-manganese-based materials, and the like, and then the cathode material of the layered oxides is obtained by modification on this substrate. Among them, the cobalt-based cathode materials mainly come from rare cobalt metal, which not only has limited resources but also has high cost. In the nickel-iron-manganese-based or nickel-iron-copper-manganese-based cathode materials, nickel is a precious metal element, which is not only costly, but also needs to be produced under oxygen when the content of nickel is higher than a certain proportion. The use of these rare and noble metal elements is not conducive to the advancement of energy storage or low-end market applications where cost is critical. Therefore, there is a need to develop a new low-cost cathode material for the sodium ion batteries.

SUMMARY OF THE INVENTION

In view of the above technical problem, an object of the present invention is to provide a zinc-containing cathode material for a sodium ion battery and a preparation method thereof. By means of a large number of experimental studies, the present inventors have found that replacing some rare and precious metals with zinc element can stabilize the crystal structure of the material. Especially during the charging and discharging process of a sodium ion battery, frequent de-intercalation of sodium ions and the presence of zinc oxide play a supporting role, which can effectively reduce the collapse of the material structure, provide vacancies for sodium ion intercalation and ensure the rate performance of the material. In addition, it reduces the content of residual alkali on the surface of the sodium ion de-intercalation material obtained by this preparation method, so that the gelation phenomenon in the battery slurrying process is avoided, and the capacity and rate of the sodium ion battery are at a relatively high level.

Specifically, the invention provides the following technical solutions.

In a first aspect, the present invention provides a cathode material for the sodium ion battery. The cathode material has a chemical formula of $Na_{1+a}M_dZn_xO_{2+c}$, wherein $-0.40 \le a \le 0.25$, $0.78 < d \le 0.93$, $0.1 < x \le 0.22$, $-0.3 < c < 0.3$; M is one or a combination of two or more selected from the group consisting of Mn, Fe, Ni, Co, Al, Zr, Y, Ca, Li, Rb, Cs, W, Ce, Mo, Ba, Ti, Mg, Ta, Nb, V, Sc, Sr, B and Cu; one diffraction peak exists when a diffraction angle $2\theta$ is around 16°, at least five diffraction peaks, preferably 6 diffraction peaks, exist when the diffraction angle $2\theta$ is 30°-40°, and one diffraction peak exists when the diffraction angle $2\theta$ is around 41°.

Preferably, in the cathode material $Na_{1+a}M_yZn_xO_{2+c}$ for the sodium ion battery, M contains an element A and an element B; the cathode material has a general formula of $Na_{1+a}B_{1-b-x}Zn_xA_bO_{2+c}$, where $0.1 < x \le 0.22$, $0.0 < b \le 0.06$, $-0.40 \le a \le 0.25$, $-0.3 < c < 0.3$, $y=1-x$; A and B are both one or a combination of two or more selected from the group consisting of Mn, Fe, Ni, Co, Al, Zr, Y, Ca, Li, Rb, Cs, W, Ce, Mo, Ba, Ti, Mg, Ta, Nb, V, Sc, Sr, B and Cu, and A and B may be the same or different.

More preferably, the B element in the cathode material for the sodium ion battery is one or a combination of two or more selected from the group consisting of Mn, Fe, Ni and Co.

Further preferably, the cathode material for the sodium ion battery has a general chemical formula of $Na_{1+a}Ni_yMn_zFe_{1-x-y-z-b}Zn_xA_bO_{2+c}$, where $0.15 \le y \le 0.35$, $0.20 \le z \le 0.38$, $-0.40 \le a \le 0.25$, $0.0 < b \le 0.06$, $-0.3 < c < 0.3$, $0.1 < x \le 0.22$.

Further preferably, the cathode material for the sodium ion battery has a general chemical formula of $Na_{1+a}Ni_yMn_zFe_{1-x-y-z}-bZn_xA_bO_{2+c}$, where $0.20 \le y \le 0.32$, $0.27 \le z \le 0.34$, $-0.40 \le a \le 0.25$, $0.0 < b \le 0.06$, $-0.3 < c < 0.3$, $0.1 < x \le 0.22$.

Preferably, the content of zinc element in the cathode material for the sodium ion battery is 5.0%-20.0% by mass.

More preferably, the content of Zn element in the cathode material for the sodium ion battery is 5.0%-15.0% by mass.

Further preferably, the content of Zn element in the cathode material for the sodium ion battery is 4.0%-14.0% by mass; and/or the content of M element in the cathode material for the sodium ion battery is 30%-50% by mass, preferably 34%-45% by mass, and more preferably 40%-45% by mass; and/or the content of Ni element in the cathode material for the sodium ion battery is 8%-20% by mass, preferably 11%-16% by mass; and/or the content of Mn element in the cathode material for the sodium ion battery is 10%-20% by mass, preferably 13%-17% by mass; and/or the content of Fe element in the cathode material for the sodium ion battery is 10%-20% by mass, preferably 13%-20% by mass, and more preferably 13%-16% by mass.

Preferably, the cathode material powder for the sodium ion battery has an X-ray diffraction graph showing an $\alpha$-NaFeO$_4$ layered structure.

Preferably, in the X-ray diffraction graph of the cathode material powder for the sodium ion battery, a full width at half maxima of the diffraction peak having a 2θ value of 30°-40° is 0.04°-0.4°, preferably 0.04°-0.30°, and more preferably 0.04°-0.25°; and/or a minor strong peak exists when 2θ is around 16° and a major strong peak exists when 2θ is around 41°; preferably, a minor strong peak exists when 2θ is around 16.5° and a major strong peak exists when 2θ is around 41.6°; and/or the full width at half maxima of the diffraction peak having a 2θ of around 16° and around 41° is 0.05°-0.35°, preferably 0.05°-0.30°, and more preferably 0.05°-0.25°.

Preferably, in the X-ray diffraction graph of the cathode material powder for the sodium ion battery, six diffraction peaks exist when 2θ is 30°-40°, where 2θ is around 32°, around 33°, around 34°, around 35°, and around 36°, respectively.

Preferably, the 6 diffraction peaks have 2θ values around 31.8°, around 33.4°, around 34.4°, around 35.2°, around 36.3°, and around 36.6°, respectively; and/or the full width at half maxima FWHM of the diffraction peak around the diffraction angle 2θ of 31.8° is 0.06°-0.25°, preferably 0.06°-0.14°, and more preferably 0.07°-0.14°; and/or the full width at half maxima FWHM of the diffraction peak around the diffraction angle 2θ of 34.4° is 0.07°-0.25°, preferably 0.06-0.13; and/or the full width at half maxima FWHM of the diffraction peak around the diffraction angle 2θ of 36.3° is 0.06°-0.25°, preferably 0.06-0.15, and more preferably 0.07-0.14; and/or the peak intensity ratio of the diffraction peak around the diffraction angle 2θ of 31.8° to the diffraction peak around the diffraction angle 2θ of 34.4° is (1-2):1; preferably, the ratio is (1.2-1.8):1; more preferably, the ratio is (1.3-1.7):1; and/or the peak intensity ratio of the diffraction peak around the diffraction angle 2θ of 36.3° to the diffraction peak around the diffraction angle 2θ of 34.4° is (2-3):1; preferably, the ratio is (2.2-2.8):1; more preferably, the ratio is (2.2-2.7):1; and/or the full width at half maxima FWHM of the diffraction peak around the diffraction angle 2θ of 16.5° is 0.08°-0.25°, preferably 0.11°-0.14°; and/or the full width at half maxima FWHM of the diffraction peak around the diffraction angle 2θ of 33.4° is 0.08°-0.23°, preferably 0.12°-0.18°, and more preferably 0.148°-0.18°; and/or the full width at half maxima FWHM of the diffraction peak around the diffraction angle 2θ of 35.2° is 0.07°-0.22°, preferably 0.13°-0.18°; and/or the full width at half maxima FWHM of the diffraction peak around the diffraction angle 2θ of 36.6° is 0.08°-0.20°, preferably 0.12°-0.16°, and more preferably 0.135°-0.16°; and/or the full width at half maxima FWHM of the diffraction peak around the diffraction angle 2θ of 41.6° is 0.06°-0.20°, preferably 0.09°-0.14°.

Preferably, the cathode material for the sodium ion battery has a specific surface area of 0.25-1.5 m$^2$/g; and/or the particle size D50 of the cathode material for the sodium ion battery is 2-15 μm.

More preferably, the cathode material for the sodium ion battery has a specific surface area of 0.69-1.5 m$^2$/g; and/or the particle size D50 of the cathode material for the sodium ion battery is 5.3-15 μm.

Further preferably, the cathode material for the sodium ion battery has a specific surface area of 0.69-1.2 m$^2$/g; and/or the particle size D50 of the cathode material for the sodium ion battery is 5.3-12 μm.

Preferably, the cathode material for the sodium ion battery has a residual alkali content of 3.15% or less than by mass, preferably 0.7-3.15% by mass, more preferably 1.25-3.15% by mass.

In a second aspect, the present invention provides two methods for preparing the cathode material for the sodium ion battery.

The first preparation method includes the steps of mixing the M source, the Zn source and the Na source uniformly and then sintering at a temperature of 750-980° C.; and/or after the sintering time of 8-40 h, cooling and pulverizing the mixture to obtain a cathode material for the sodium ion battery.

The second preparation method includes the steps of mixing an M source and a Zn source in a certain proportion to obtain a precursor; mixing same uniformly with a Na source, and sintering at a temperature of 750-980° C.; and/or after the sintering time of 8-40 h, cooling and pulverizing the mixture to obtain a cathode material for the sodium ion battery.

Preferably, in the first preparation method, the mixing is performed uniformly by ball milling. More preferably, the frequency of ball milling is 20-50 Hz, preferably 25-40 Hz; and/or the ball milling time is 10-60 min, preferably 10-45 min.

Preferably, the sintering temperature is 880-960° C.; and/or the sintering time is 15-25 h; and/or the heating rate is 3-10° C./min.

Preferably, the pulverization is performed using a disc mill, more preferably, at a disc spacing of 0-2 mm, and/or a rotational speed of 500-3000 r/min.

Preferably, the sintered gas is selected from air, oxygen and a mixed gas thereof.

Preferably, the sodium source is one or a combination of two or more selected from the group consisting of sodium hydroxide, sodium carbonate, sodium nitrate, sodium oxalate, sodium chloride, sodium fluoride and sodium acetate; and/or the M source is selected from oxides or salts or organics thereof of one or a combination of two or more selected from the group consisting of Mn, Fe, Ni, Co, Al, Zr, Y, Ca, Li, Rb, Cs, W, Ce, Mo, Ba, Ti, Mg, Ta, Nb, V, Sc, Sr, B and Cu, or salts or organics thereof.

Preferably, the M source is selected from carbonates, phosphates, nitrates or oxides of one or a combination of two or more selected from the group consisting of Mn, Fe, Ni, Co, Al, Zr, Y, Ca, Li, Rb, Cs, W, Ce, Mo, Ba, Ti, Mg, Ta, Nb, V, Sc, Sr, B and Cu.

More preferably, the M source is one or a combination of two or more selected from the group consisting of manganese dioxide, manganese carbonate, nickel oxide, nickel carbonate, ferric oxide, ferrous oxalate, ferrous phosphate, and copper sulfate; and/or, the A source is selected from oxides or salts or organics thereof of one or a combination of two or more selected from the group consisting of Co, Al, Zr, Y, Ca, Li, Rb, Cs, W, Ce, Mo, Ba, Ti, Mg, Ta, Nb, V, Sc, Sr, B and Cu.

Preferably, the A source is selected from carbonates, phosphates, nitrates or oxides of one or a combination of two or more selected from the group consisting of Al, Zr, Y, Ca, Li, Rb, Cs, Ba, Ti, Mg, Nb, V, Sc, Sr, B and Cu.

More preferably, the A source is one or a combination of two or more selected from the group consisting of calcium oxide, boron oxide, niobium oxide, aluminum oxide, titanium oxide, magnesium oxide, copper oxide, yttrium(III) oxide, zirconium oxide or copper sulfate.

Preferably, a sodium ion cathode material is prepared by the above-mentioned method for preparing the cathode material for the sodium ion battery.

In a third aspect, the present invention provides a sodium ion battery positive electrode including at least one of the cathode materials for the sodium ion battery as a positive electrode active substance.

In a fourth aspect, the invention provides a sodium ion battery including a positive electrode, a negative electrode and an electrolyte containing a sodium salt.

Preferably, the sodium ion battery is applied as a power source in an electrical power system, an energy storage system, a mobile storage device or an electric vehicle.

Preferably, the sodium ion battery is applied in electric vehicles (xEV), electric bicycles, electric two-wheeled vehicles, Class A00 electric vehicles and the like.

In a fifth aspect, the present invention provides an electrical power, an energy storage system or a mobile storage device prepared by using the sodium ion battery.

The invention has the following beneficial effects.

The cathode material for the sodium ion battery provided in the present invention has a low residual alkali concentration on the surface, and has excellent air stability and rate performance. In addition, replacing some rare and precious metals, such as nickel, with zinc element can stabilize the crystal structure of the material. Especially during the charging and discharging process of a sodium ion battery, frequent de-intercalation of sodium ions and the presence of zinc oxide play a supporting role, which can effectively reduce the collapse of the material structure, provide vacancies for sodium ion intercalation and ensure the rate performance of the material. The discharge capacity of 0.1 C at 4-2V is 124.7 Ah/g and above.

DETAILED DESCRIPTION OF THE INVENTION

Figure 1:
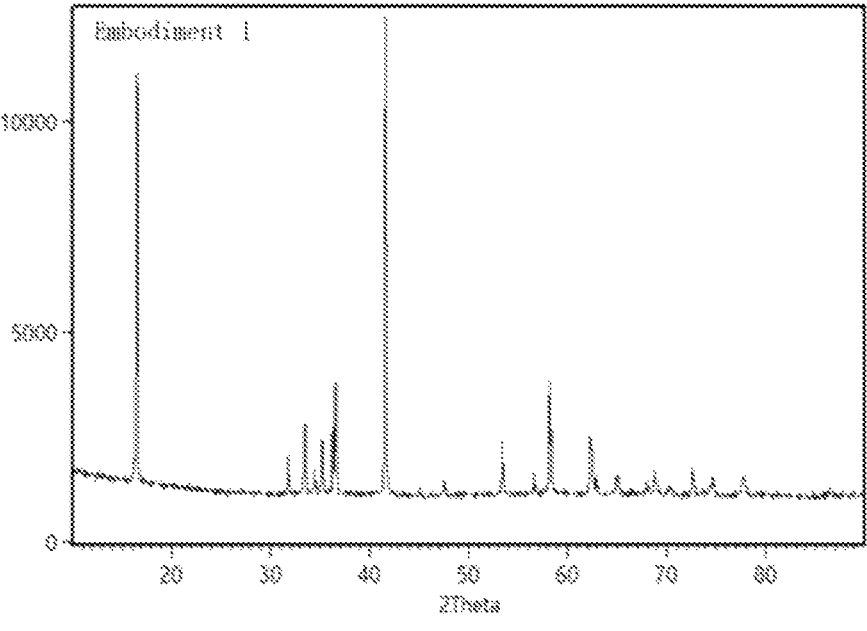
FIG. 1 is an XRD graph of a sodium ion cathode material according to Example 1.

As described above, it is an object of the present invention to provide a zinc-containing cathode material for a sodium ion battery and a method and application thereof.

By means of a large number of experimental studies, the present inventors have found that replacing some rare and precious metals cobalt, nickel or copper with zinc element can stabilize the crystal structure of the material. Especially during the charging and discharging process of a sodium ion battery, frequent de-intercalation of sodium ions and the presence of zinc oxide play a supporting role, which can effectively reduce the collapse of the material structure, provide vacancies for sodium ion intercalation and ensure the rate performance of the material. Furthermore, zinc and oxygen are mostly ionically bonded. More oxygen ions can be much easily captured in the presence of zinc ions, which provides more redox electric pairs, and effectively ensure the capacity performance of the material.

In addition, the present invention enables the residual alkali (free sodium) of the cathode material for the sodium ion battery to be at a relatively low level by adjusting the structure of the cathode material of the sodium ion battery. The cathode material for the sodium ion battery of the present invention has a special layered structure. In an X-ray diffraction graph thereof, there are six diffraction peaks at a diffraction angle $2\theta$ of 30°-40°, and the full width at half maxima of these diffraction peaks is 0.04°-0.4°, the material has a full width at half maxima of 0.05°-0.35° of diffraction peaks around diffraction angles $2\theta$ of 16° (it is around the diffraction angle X° appearing in the present invention, meaning that the diffraction angle is X°±1°, such as 16°±1°, i.e., 15°-17°) and 41°. On the one hand, these special diffraction peaks and full width at half maximas make the structure of the material more stable, ensure the sufficient occupation of sodium ions inside the material, reduce the free sodium ions on the surface of the material, and make the residual alkali content of the material at a relatively low level. The material can be produced under the condition of humidity <40% during the battery slurrying, and the slurry will not gel. On the other hand, these special diffraction peaks and full width at half maxima make the material have special crystal plane spacing and transport channels, which provide adequate channels for the transport and diffusion of sodium ions into the material. The sodium ions can be easily de-intercalated during charge and discharge of the battery, so that the sodium ion battery has excellent capacity and rate performance.

In an embodiment of the present invention, there is provided a cathode material for the sodium ion battery, the cathode material having the general chemical formula of $Na_{1+a}M_dZn_xO_{2+c}$, where $-0.40 \leq a \leq 0.25$, $0.78 < d \leq 0.93$, $0.1 < x \leq 0.22$, $-0.3 < c < 0.3$. M is one or a combination of two or more selected from the group consisting of Mn, Fe, Ni, Co, Al, Zr, Y, Ca, Li, Rb, Cs, W, Ce, Mo, Ba, Ti, Mg, Ta, Nb, V, Sc, Sr, B and Cu. One diffraction peak exists when a diffraction angle $2\theta$ is around $16°$. Six diffraction peaks exist when the diffraction angle $2\theta$ is $30°$-$40°$. One diffraction peak exists when the diffraction angle $2\theta$ is around $41°$.

In another embodiment of the present invention, there is provided a method for preparing a cathode material for the sodium ion battery by including the following steps (there are two preparation methods in the present invention, and the cathode material for the sodium ion battery can be prepared by taking any one of the preparation methods).

Method I (1) An M source, an Zn source and a Na source were mixed uniformly in a molar ratio M:Zn:Na=(0.78-0.93):(0.1-0.22):(0.6-1.25).

(2) Then the mixture was sintered at a temperature rising rate of 3-10° C./min to 750-980° C. for a sintering time of 8-40 h, cooled and pulverized to obtain a cathode material for the sodium ion battery.

Method II (1) An M source and an Zn source were mixed uniformly in a certain molar ratio uniformly to obtain a precursor.

(2) The mixture was then mixed uniformly with a Na source (M source, Zn source and Na source in molar ratio of M:Zn:Na=(0.78-0.93):(0.1-0.22):(0.6-1.25)), heated at a heating rate of 3-10° C./min to 750-980° C. for sintering at a sintering time of 8-40 h, cooled, and pulverized to obtain a cathode material for the sodium ion battery.

Unless otherwise stated, the starting materials used in the examples of the present application (sodium source, M source and Zn source) are commercially available. The devices used in the examples of the invention are summarized as follows: 1) Laser Particle Size Analyzer, Model MSU2000, Malvern Instruments Ltd. UK; 2) Automatic Specific Surface and Porosity Analyzer, TriStar II 3020, Micromeritics Instrument Corp; 3) Powder Ray Diffracto-meter, X' Pert PRO MPD, Panaco, Netherlands; 4) Icp-OES iCAP 6300 Inductively Coupled Plasma Atomic Emission Spectrometer; 5) Xinwei Battery Test System, CT-4008-5V50 mA-164, Xinwei New Energy Technology Co. Ltd.; 6) High-efficiency Vacuum Drying Oven, KP-BA K-03E-02, Dongguan Kerui Electromechanical Equipment Co. Ltd.; 7) Ultramicro stone disk mill, Suzhou Xiran Industrial Equip-ment Co. Ltd.; 8) Roller Kiln, 36 meters, Huayou New Energy Kiln Equipment Co. Ltd.

The XRD test method for the cathode material for the sodium ion battery in the embodiments of the present invention includes: test conditions, light pipe-Cu target, wavelength 1.54060 Å, Be window; incident light path-soller slit 0.04 rad, divergence slit ½°, shading plate 10 mm, anti-scattering slit 1°; diffraction light path-anti-scattering slit 8.0 mm, soller slit 0.04 rad, large Ni light-filter; scanning range, 10°-90°; scanning step, 0.013°; dwell time, 30.6 s; voltage, 40 kV; current, 40 mA. Powder sample preparation: the powder was put into the groove of a glass slide by a clean sampling spoon (for a large-particle sample, it was necessary to grind it into powder <50 μm). One side (>20 mm) of scraping blade was placed against the surface of glass slide, and the other end was slightly lifted (at an included angle <10°). The surface of powder sample was scraped flatly by the edge of scraping blade, and scraped flatly again when the glass slide rotated by 90°. It was repeatedly scraped in two directions for several times until the surface of sample was free from texture. After removing the excess powder around the glass slide, the glass slide was placed into a powder ray diffraction analyzer. Sample analysis: the XRD graph was refined using the software High-Score Plus, including firstly determining the background, selecting a peak to confirm the peak, repeating the fitting, recording the Williamson-Hall plot to calculate the grain size, selecting a corresponding phase to perform the matching and unit cell refinement, and recording unit cell parameters.

Here, the particle size of the sodium ion cathode material in the embodiments of the present invention was measured according to the PRC national standard GB/T19077-2016 particle size distribution laser diffraction method. Test instrument: Malvern, master Size 2000 Laser Particle Size Analyzer. Test steps: 1 g powder was weighed and added into 60 ml pure water. After external ultrasound for 5 min, the sample was poured into a sampler for conducting the test and recording the test data. Test conditions: the test principle was Mie theory (light scattering) theory, with a detection angle of 0-135°, an external ultrasonic intensity of 40 KHz, 180 w, a particle refractive index of 1.692, a particle absorption rate of 1, a sample test time of 6 s, a background test snap number of 6,000 times, and a shading degree of 8-12%.

Here, according to the test method for residual alkali in the sodium ion cathode material in the embodiments of the present invention, 30 g±0.01 g sample was accurately weighed and put into a 250 mL conical flask, with magneton and 100 mL deionized water added. The mixture was put on a magnetic stirrer which was started for stirring for 30 minutes. The mixed solution was filtered with a qualitative filter paper and a funnel. 1 mL of filtrate was transferred into a 100 mL beaker, with a magneton added. The beaker was placed on a magnetic stirrer, with 2 drops of phenolphthalein indicator added. It was titrated with 0.05 mol/L hydrochloric acid standard volumetric solution ($V_{initial}$=0) until the color of solution changes from red to colorless, with the volume V1 of 0.05 mol/L hydrochloric acid standard volumetric solution (Terminal 1, $V_1=V_{Terminal1}-V_{Initial1}$) recorded. 2 drops of methyl red indicator were added, the color of solution changing from colorless to yellow. It was titrated with 0.05 mol/L hydrochloric acid standard titration solution until the color of solution changes from yellow to orange. The beaker was placed on a heating furnace and heated until the solution boils (the color of the solution was changed from orange to yellow). The beaker was removed and cooled to room temperature. The beaker was placed on a magnetic stirrer and titrated with 0.05 mol/L hydrochloric acid stan-dard volumetric solution until the color of solution was changed from yellow to light red. The volume $V_2$ of 0.05 mol/L hydrochloric acid standard volumetric solution was recorded (Terminal 2, $V_2=V_{Terminal2}-V_{Terminal1}$).

The calculation formula of free sodium content is as follows.

$$Na^+(wt\ \%) = \frac{c(V_1+V_2) \times 10^{-3} \times M \times 100}{m} \times 100\%$$

-continued $$Na_2CO_3(wt \%) = \frac{c \times V_2 \times 10^{-3} \times M_1 \times 100}{m} \times 100\%$$

$$NaOH(wt \%) = \frac{c \times (V_1 - V_2) \times 10^{-3} \times M_2 \times 100}{m} \times 100\%$$

M is the relative atomic mass of sodium. $M_1$ is the relative molecular mass of sodium carbonate. $M_2$ is the relative molecular mass of sodium hydroxide. m is the mass of the sample per gram. $V_1$ is a first titration terminal/mL. $V_2$ is a second titration terminal/mL. c is the concentration of hydrochloric acid standard titration solution, mol/L. 100 in the molecule represents a dilution factor.

Here, according to the test method for the mass percentage content of elements in the sodium ion cathode material in the embodiments of the present invention, we adopted an ICP-OES iCAP 6300 inductively coupled plasma atomic emission spectrometry analyzer. The number of detector detection units is more than 290000. The Camera temperature of detector cooling system is <−35° C. The temperature of optical system optical chamber is 38±0.1° C. The optical system wavelength range is 166 nm-847 nm. The plasma observation mode has a way of vertical observation. The plasma observation height is 14 mm, with a RF power 1150 W and a frequency 27.12 MHz. The injection system auxiliary gas flow is 0.5 L/min, the injection system atomization gas flow 0.6 L/min, and the pump speed 50 rpm. Microtest: 0.2000-0.2100 g of sample was accurately weighed and put in a 50 mL quartz beaker, with 10 ml of 1:1 aqua regia added. The mixture was covered by a watch glass, completely dissolved in the heating furnace, and transferred to a 50 mL volumetric flask for shaking well at a constant volume. It was tested on the machine to record the data. According to the main quantity measurement, 1 ml of the well-shaken solution was transferred to a 100 mL volumetric flask, diluted to 100 mL, and shaken well. It was tested on the machine to record the data.

The sodium ion battery of the present invention is composed of an electrode, an electrolyte, a diaphragm, and an aluminum-plastic film. Specifically, the electrode includes a positive electrode and a negative electrode. The positive electrode is made of a material including a positive electrode current collector and a positive electrode active substance coated on the positive electrode current collector, and a binder, a conductive aid, etc. The positive electrode active substance is the cathode material of the present invention. The negative electrode is made of a material including a current collector and a negative electrode active substance coated on the current collector, and a binder, a conductive aid, etc. The diaphragm is a PP/PE thin film conventionally used in the art for separating a positive electrode and a negative electrode from each other. The aluminum-plastic film is an inclusion body for the positive electrode, the negative electrode, the diaphragm, and the electrolyte.

The binder in the present invention is mainly used for improving adhesion characteristics between positive electrode active material particles and between the positive electrode active material particles and the current collector. The binder of the present invention may be selected from conventional binders commercially available in the art. In particular, the binder may be selected from polyvinyl alcohol, carboxymethyl cellulose, hydroxypropyl cellulose, polyvinyl chloride, carboxylated polyvinyl chloride, polyvinyl fluoride, ethanediyloxy-contained polymers, polyvinyl pyrrolidone, polyurethane, polyvinylidene fluoride, polyvinylidene fluoride, polyethylene, polypropylene, styrene-butadiene rubber, acrylated styrene-butadiene rubber, epoxy, nylon, or combinations thereof.

The conductive aid of the present invention may be selected from conventional conductive aids commercially available in the art. In particular, the conductive aid may be selected from a carbon-based material (e.g., natural graphite, artificial graphite, carbon black, acetylene black, ketjen black, or carbon fiber), a metal-based material (e.g. metal powder or metal fibers including copper, nickel, aluminum, silver, etc.), a conductive polymer (e.g. a polyphenylene derivative), or a combination thereof.

In the following examples, a sodium button battery is made by the cathode material prepared according to the present invention in the following manner.

Positive electrode preparation: the cathode material prepared according to the present invention, the binder polyvinylidene fluoride (PVDF) and the conductive carbon black (S. P) are thoroughly mixed in a weight ratio of 7:2:1 and stirred to form a uniform slurry which was coated on an aluminum foil current collector, dried and pressed to form an electrode piece. The pressed positive electrode piece was punched, weighed and baked. Then the battery was assembled in a vacuum glove box. The shell bottom of the button battery was firstly placed, and foamed nickel (2.5 mm) and a negative electrode metal sodium sheet were placed on the shell bottom (Manufacturer: Shenzhen Youyan Technology Co. Ltd.). 0.5 g of electrolyte in an environment with a relative humidity of less than 1.5% was injected, the electrolyte being a mixed solvent of ethylene carbonate (EC), diethyl carbonate (DEC) and dimethyl carbonate (DMC) in a mass ratio of 1:1:1, and the electrolyte being 1 mol/L sodium hexafluorophosphate solution. The diaphragm and the positive electrode sheet were added, and then the shell cover of the button battery was covered for sealing, the button cell model being CR2430.

The unit of the full width at half maxima of the diffraction peak in the present invention is the same as the unit of the diffraction angle 2θ. The invention is further described in details below by the specific examples and combined with the attached drawings.

Example 1

Sodium carbonate, manganese carbonate, nickel carbonate, ferric oxide and zinc oxide were weighed for a corresponding amount in a molar ratio, Na:Mn:Ni:Fe:Zn=0.87:0.33:0.23:0.29:0.15, measured according to the chemical formula. Then the mixture was ball milled 40 Hz, 10 min for uniformly mixing. The uniformly mixed material was heated to a constant temperature of 960° C. at a heating rate of 5° C./min for 12 hours under an air atmosphere, and then naturally cooled, pulverized and sieved to obtain a cathode material having a molecular formula of $Na_{0.87}Ni_{0.23}Mn_{0.33}Zn_{0.15}Fe_{0.29}O_2$.

FIG. 1 is a XRD graph of the cathode material of this example. It can be seen from the figure that the diffraction peak at a diffraction angle 2θ of 16.5257° has a full width at half maxima FWHM of 0.128°, the diffraction peak being a minor strong peak; the diffraction peak at the diffraction angle 2θ of 31.774° has a full width at half maxima FWHM of 0.076°; the diffraction peak at the diffraction angle 2θ of 33.439° has a full width at half maxima FWHM of 0.148°; the diffraction peak at the diffraction angle 2θ of 34.453° has a full width at half maxima FWHM of 0.083°; the diffraction peak at the diffraction angle 2θ of 35.208° has a full width at half maxima FWHM of 0.154°; the diffraction peak at the diffraction angle 2θ of 36.263° has a full width at half maxima FWHM of 0.074°; the diffraction peak at the diffraction angle 2θ of 36.5543° has a full width at half maxima FWHM of 0.135°; the diffraction peak at the diffraction angle 2θ of 41.573° has a full width at half maxima FWHM of 0.1121°, the diffraction peak being a major strong peak. The peak intensity ratio of a diffraction peak around a diffraction angle 2θ of 31.8° to a diffraction peak around a diffraction angle 2θ of 34.4° is 1.6:1. The peak intensity ratio of a diffraction peak around a diffraction angle 2θ of 36.3° to a diffraction peak around a diffraction angle 2θ of 34.4° is 2.7:1.

Figure 2:
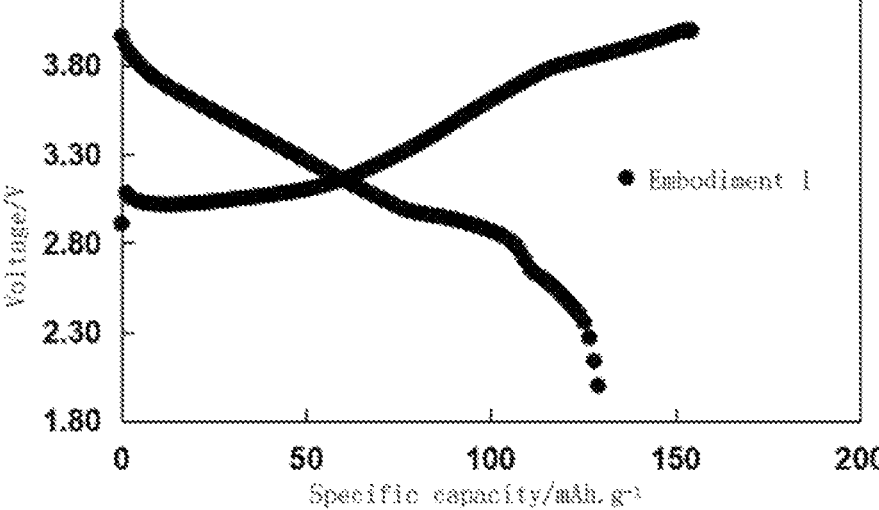
FIG. 2 is a charge-discharge graph of the sodium ioncathode material according to Example 1.

The cathode material is tested for particle size and specific surface area and has a D50 of 4.9 μm and a BET of 1.2 m²/g. Its surface residual alkali content is 1.25%. The diffraction peak and full width at half maxima, particle size D50, specific surface area, and amount of surface alkali remaining in the XRD graph of the cathode material are summarized in Table 1. A button battery is prepared from the cathode material and tested for capacity and rate. See Table 1 for details of the test data. The charge-discharge curve of 0.1 C/0.1 C at 4.0-2.0V is shown in FIG. 2.

Example 2

Sodium carbonate, manganese dioxide, nickel oxide, ferric oxide and zinc oxide were weighed for a corresponding amount in a molar ratio Na:Mn:Ni:Fe:Zn=0.80:0.30:0.22:0.27:0.21, measured according to the chemical formula. Then the mixture was ball milled 35 Hz, 20 min for uniformly mixing. The uniformly mixed material was heated to a constant temperature of 900° C. at a heating rate of 3° C./min for 16 hours under an air atmosphere, and then naturally cooled, pulverized and sieved to obtain a cathode material having a molecular formula of $Na_{0.8}Ni_{0.22}Mn_{0.3}Zn_{0.21}Fe_{0.27}O_2$.

Figures 3, 4:
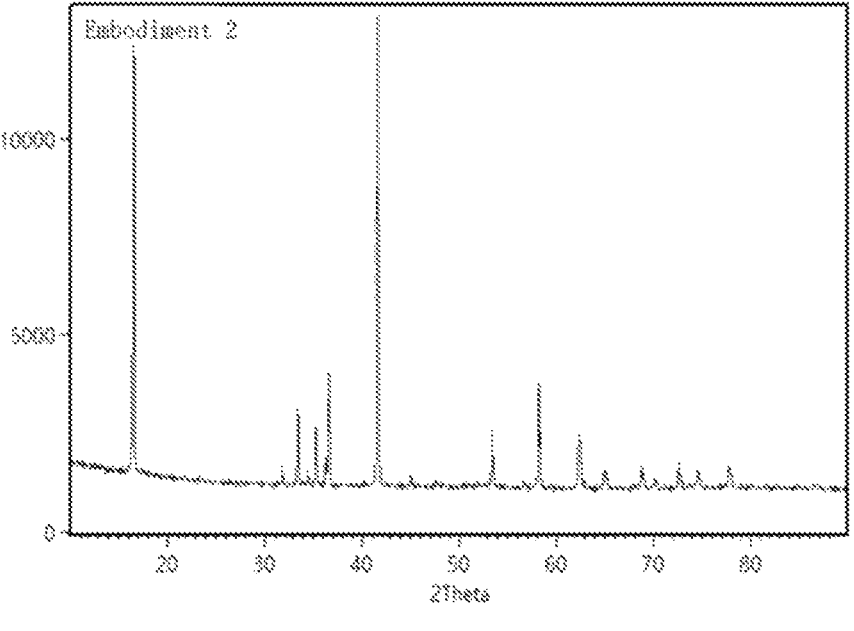
FIG. 3 is a XRD graph of the sodium ion cathode material according to Example 2.
FIG. 4 is a charge-discharge graph of the sodium ion cathode material according to Example 2.

FIG. 3 shows the XRD graph of the cathode material of this example. It can be seen from the figure that the diffraction peak at a diffraction angle 2θ of 16.52° has a full width at half maxima FWHM of 0.1252°, the diffraction peak being a minor strong peak; the diffraction peak at the diffraction angle 2θ of 31.782° has a full width at half maxima FWHM of 0.064°; the diffraction peak at the diffraction angle 2θ of 33.423° has a full width at half maxima FWHM of 0.137°; the diffraction peak at the diffraction angle 2θ of 34.444° has a full width at half maxima FWHM of 0.08°; the diffraction peak at the diffraction angle 2θ of 35.232° has a full width at half maxima FWHM of 0.145°; the diffraction peak at the diffraction angle 2θ of 36.274° has a full width at half maxima FWHM of 0.068°; the diffraction peak at the diffraction angle 2θ of 36.575° has a full width at half maxima FWHM of 0.135°; the diffraction peak at the diffraction angle 2θ of 41.587° has a full width at half maxima FWHM of 0.1102°, the diffraction peak being a major strong peak. The peak intensity ratio of a diffraction peak around a diffraction angle 2θ of 31.8° to a diffraction peak around a diffraction angle 2θ of 34.4° is 1.8:1. The peak intensity ratio of a diffraction peak around a diffraction angle 2θ of 36.3° to a diffraction peak around a diffraction angle 2θ of 34.4° is 2.8:1.

The cathode material is tested for particle size and specific surface area and has a D50 of 5.0 μm and a BET of 0.97 m²/g. Its surface residual alkali content is 0.78%. The diffraction peak and full width at half maxima, particle size D50, specific surface area, and amount of surface alkali remaining in the XRD graph of the cathode material are summarized in Table 1. A button battery is prepared from the cathode material and tested for capacity and rate. See Table 1 for details of the test data. The charge-discharge curve of 0.1 C/0.1 C at 4.0-2.0V is shown in FIG. 4.

Example 3

Sodium carbonate, manganese trioxide, nickel oxide, ferrous oxalate, zinc oxide, and calcium oxide were weighed for a corresponding amount in a molar ratio, Na:Mn:Ni:Fe:Zn:Ca=0.76:0.29:0.21:0.27:0.21:0.02, measured according to the chemical formula. Then the mixture was ball milled 30 Hz, 30 min for uniformly mixing. The uniformly mixed material was heated to a constant temperature of 860° C. at a heating rate of 7° C./min for 20 hours under an air atmosphere, and then naturally cooled, pulverized and sieved to obtain a cathode material having a molecular formula of $Na_{0.76}Ni_{0.21}Mn_{0.29}Zn_{0.21}Fe_{0.27}Ca_{0.02}O_2$.

Figure 5:
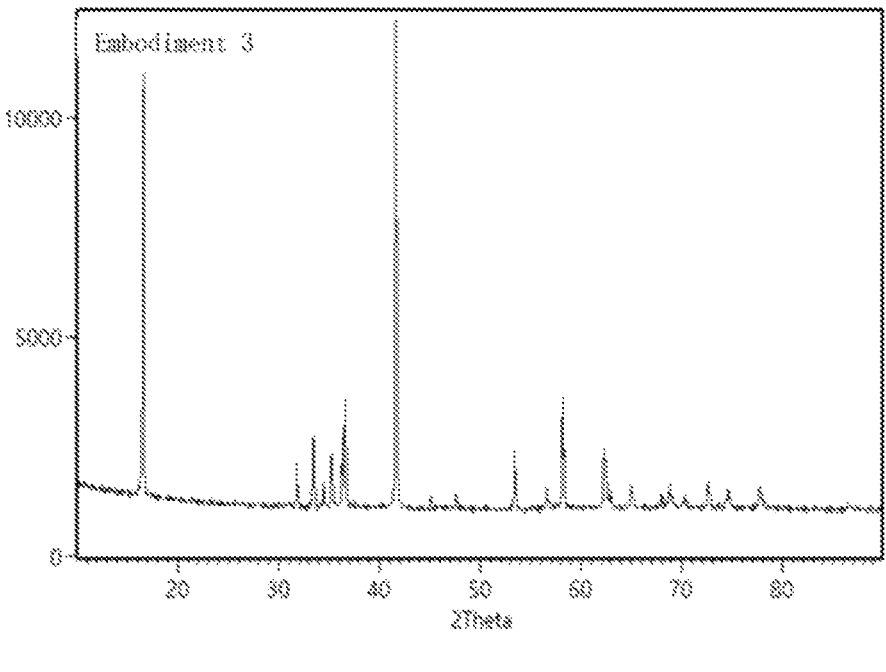
FIG. 5 is a XRD graph of the sodium ioncathode material according to Example 3.

FIG. 5 shows the XRD graph of the cathode material of this example. It can be seen from the figure that the diffraction peak at a diffraction angle 2θ of 16.5456° has a full width at half maxima FWHM of 0.13°, the diffraction peak being a minor strong peak; the diffraction peak at the diffraction angle 2θ of 31.789° has a full width at half maxima FWHM of 0.074°; the diffraction peak at the diffraction angle 2θ of 33.445° has a full width at half maxima FWHM of 0.163°; the diffraction peak at the diffraction angle 2θ of 34.463° has a full width at half maxima FWHM of 0.077°; the diffraction peak at the diffraction angle 2θ of 35.244° has a full width at half maxima FWHM of 0.16°; the diffraction peak at the diffraction angle 2θ of 36.2902° has a full width at half maxima FWHM of 0.073°; the diffraction peak at the diffraction angle 2θ of 36.5856° has a full width at half maxima FWHM of 0.143°; the diffraction peak at the diffraction angle 2θ of 41.5986° has a full width at half maxima FWHM of 0.1092°, the diffraction peak being a major strong peak. The peak intensity ratio of a diffraction peak around a diffraction angle 2θ of 31.8° to a diffraction peak around a diffraction angle 2θ of 34.4° is 1.6:1. The peak intensity ratio of a diffraction peak around a diffraction angle 2θ of 36.3° to a diffraction peak around a diffraction angle 2θ of 34.4° is 2.7:1.

Figure 6:
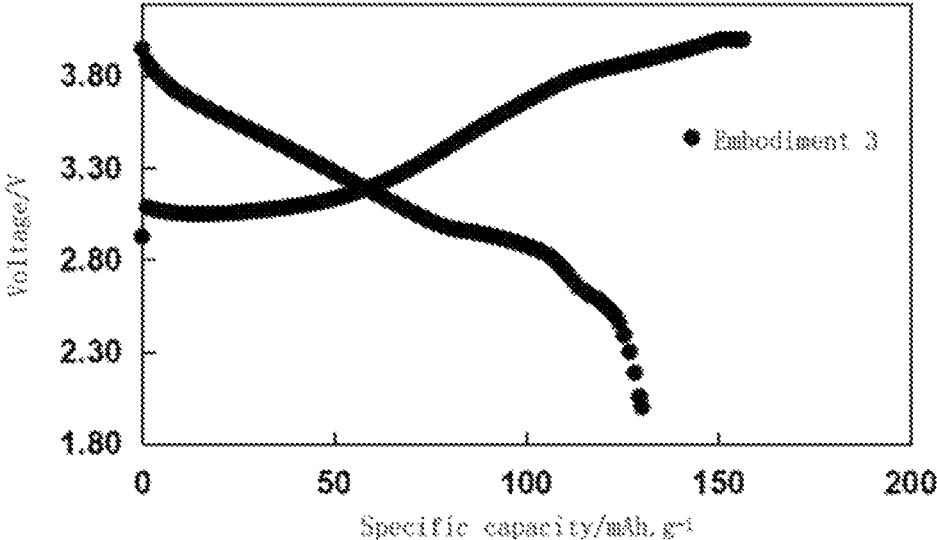
FIG. 6 is a charge-discharge graph of the sodium ion cathode material according to Example 3.

The cathode material is tested for the particle size and specific surface area and has a particle size D50 of 5.3 μm, a BET of 0.94 m²/g, and a content of residual alkali on the surface of 2.28%. The diffraction peak and full width at half maxima, particle size D50, specific surface area, and amount of surface alkali remaining in the XRD graph of the cathode material are summarized in Table 1. A button battery is prepared from the cathode material and tested for capacity and rate. See Table 1 for details of the test data. The charge-discharge curve of 0.1 C/0.1 C at 4.0-2.0V is shown in FIG. 6.

Example 4

Sodium nitrate, manganese trioxide, nickel oxide, ferrous oxalate, zinc oxide and boron trioxide were weighed for a corresponding amount in a molar ratio, Na:Mn:Ni:Fe:Zn:B=0.8:0.294:0.21:0.28:0.21:0.006, measured according to the chemical formula. Then the mixture was ball milled 25 Hz, 45 min for uniformly mixing. The uniformly mixed material was heated to a constant temperature of 890° C. at a heating rate of 10° C./min for 24 hours under an air atmosphere, and then naturally cooled, pulverized and sieved to obtain a cathode material having a molecular formula of $Na_{0.8}Ni_{0.21}Mn_{0.294}Zn_{0.21}Fe_{0.28}B_{0.006}O_2$.

Figure 7:
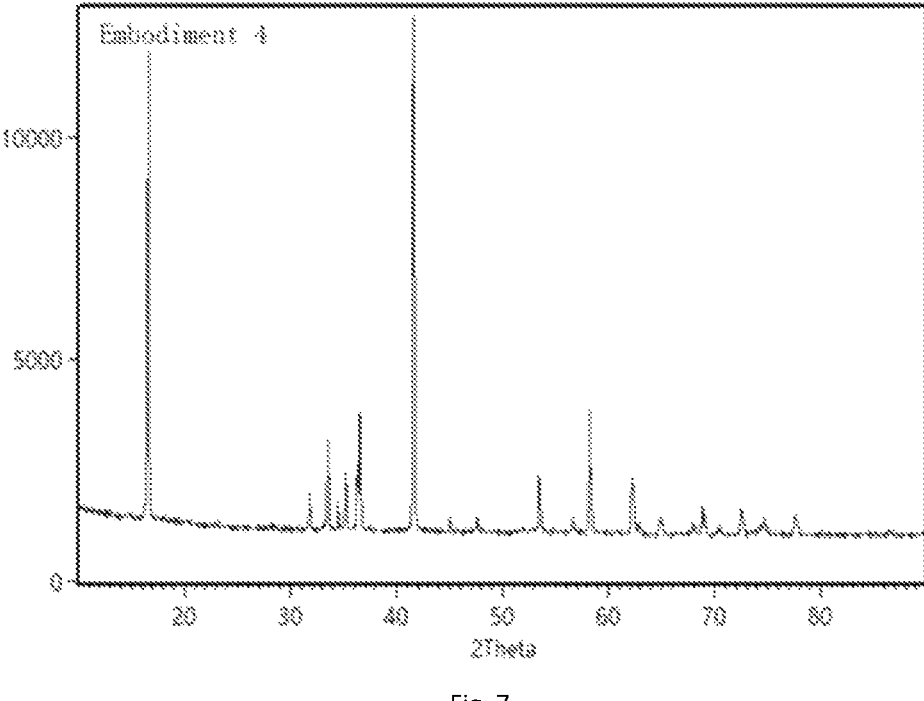
FIG. 7 is a XRD graph of the sodium ion cathode material according to Example 4.

FIG. 7 shows the XRD graph of the cathode material of this example. It can be seen from the figure that the diffraction peak at a diffraction angle 2θ of 16.58° has a full width at half maxima FWHM of 0.1205°, the diffraction peak being a minor strong peak; the diffraction peak at the diffraction angle 2θ of 31.786° has a full width at half maxima FWHM of 0.106°; the diffraction peak at the diffraction angle 2θ of 33.5115° has a full width at half maxima FWHM of 0.147°; the diffraction peak at the diffraction angle 2θ of 34.461° has a full width at half maxima FWHM of 0.078°; the diffraction peak at the diffraction angle 2θ of 35.176° has a full width at half maxima FWHM of 0.147°; the diffraction peak at the diffraction angle 2θ of 36.2824° has a full width at half maxima FWHM of 0.082°; the diffraction peak at the diffraction angle 2θ of 36.5282° has a full width at half maxima FWHM of 0.134°; the diffraction peak at the diffraction angle 2θ of 41.5678° has a full width at half maxima FWHM of 0.1078°, the diffraction peak being a major strong peak. The peak intensity ratio of a diffraction peak around a diffraction angle 2θ of 31.8° to a diffraction peak around a diffraction angle 2θ of 34.4° is 1.2:1. The peak intensity ratio of a diffraction peak around a diffraction angle 2θ of 36.3° to a diffraction peak around a diffraction angle 2θ of 34.4° is 2.5:1.

Figure 8:
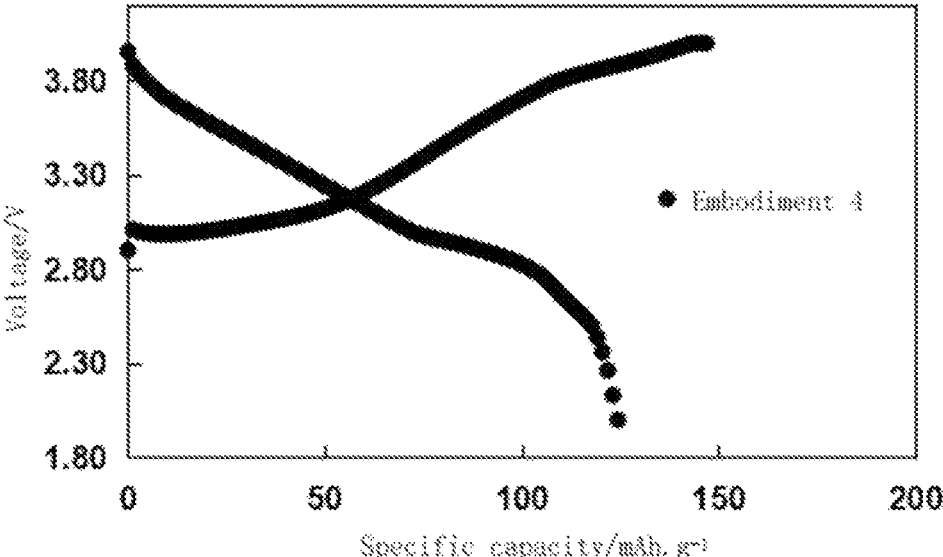
FIG. 8 is a charge-discharge graph of the sodium ion cathode material according to Example 4.

The cathode material is tested for the particle size and specific surface area and has a particle size D50 of 7.5 μm, a BET of 0.43 m²/g, and a content of residual alkali on the surface of 2.21%. The diffraction peak and full width at half maxima, particle size D50, specific surface area, and amount of surface alkali remaining in the XRD graph of the cathode material are summarized in Table 1. A button battery is prepared from the cathode material and tested for capacity and rate. See Table 1 for details of the test data. The charge-discharge curve of 0.1 C/0.1 C at 4.0-2.0V is shown in FIG. 8.

Example 5

Manganese carbonate, nickel carbonate, ferrous oxalate, zinc oxide and calcium oxide were weighed for a corresponding amount in a molar ratio, Mn:Ni:Fe:Zn:Ca=0.28:0.3:0.27:0.13:0.02, measured according to the chemical formula, then added into a sand mill to sand 60 min to obtain a wet precursor. The wet precursor was spray-dried to obtain a precursor. The precursor was uniformly mixed with sodium chloride according to the stoichiometric ratio (Na:Mn:Ni:Fe:Zn:Ca=1.1:0.28:0.3:0.27:0.13:0.02). The uniformly mixed material was to a constant temperature of 900° C. at a heating rate of CC/min under an air atmosphere for 14 hours, then naturally cooled, pulverized and sieved to obtain a cathode material having a molecular formula of $Na_{1.1}Ni_{0.3}Mn_{0.28}Zn_{0.13}Fe_{0.27}Ca_{0.02}O_2$.

Figure 9:
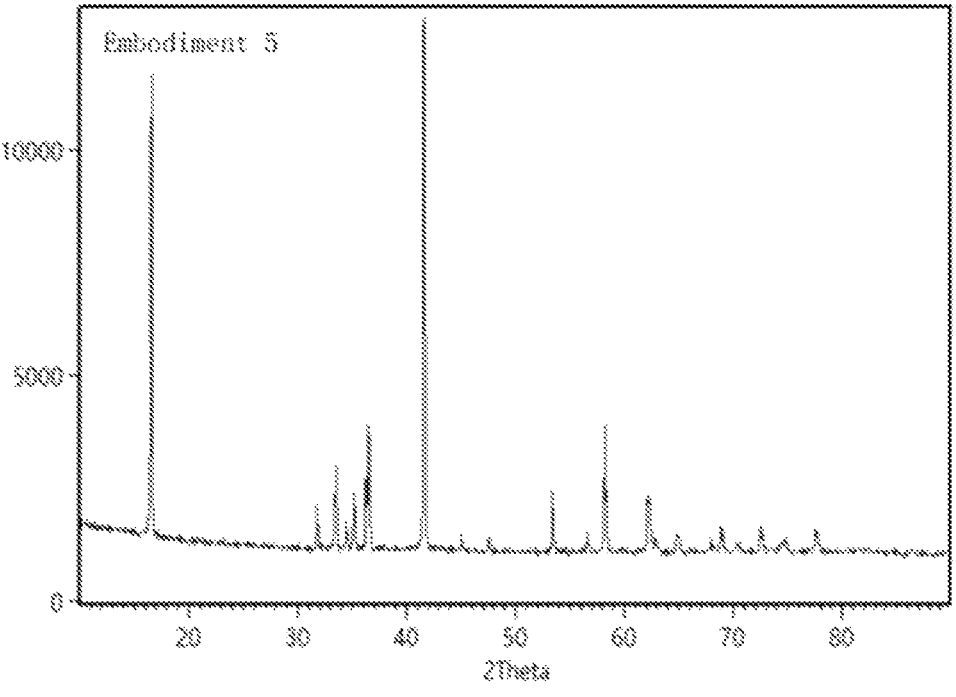
FIG. 9 is a XRD graph of the sodium ion cathode material according to Example 5.

FIG. 9 shows the XRD graph of the cathode material of this example. It can be seen from the figure that the diffraction peak at a diffraction angle 2θ of 16.559° has a full width at half maxima FWHM of 0.1263°, the diffraction peak being a minor strong peak; the diffraction peak at the diffraction angle 2θ of 31.772° has a full width at half maxima FWHM of 0.091°; the diffraction peak at the diffraction angle 2θ of 33.49° has a full width at half maxima FWHM of 0.171°; the diffraction peak at the diffraction angle 2θ of 34.44° has a full width at half maxima FWHM of 0.083°; the diffraction peak at the diffraction angle 2θ of 35.159° has a full width at half maxima FWHM of 0.147°; the diffraction peak at the diffraction angle 2θ of 36.264° has a full width at half maxima FWHM of 0.088°; the diffraction peak at the diffraction angle 2θ of 36.5109° has a full width at half maxima FWHM of 0.135°; the diffraction peak at the diffraction angle 2θ of 41.5515° has a full width at half maxima FWHM of 0.1077°, the diffraction peak being a major strong peak. The peak intensity ratio of a diffraction peak around a diffraction angle 2θ of 31.8° to a diffraction peak around a diffraction angle 2θ of 34.4° is 1.4:1. The peak intensity ratio of a diffraction peak around a diffraction angle 2θ of 36.3° to a diffraction peak around a diffraction angle 2θ of 34.4° is 2.6:1.

Figure 10:
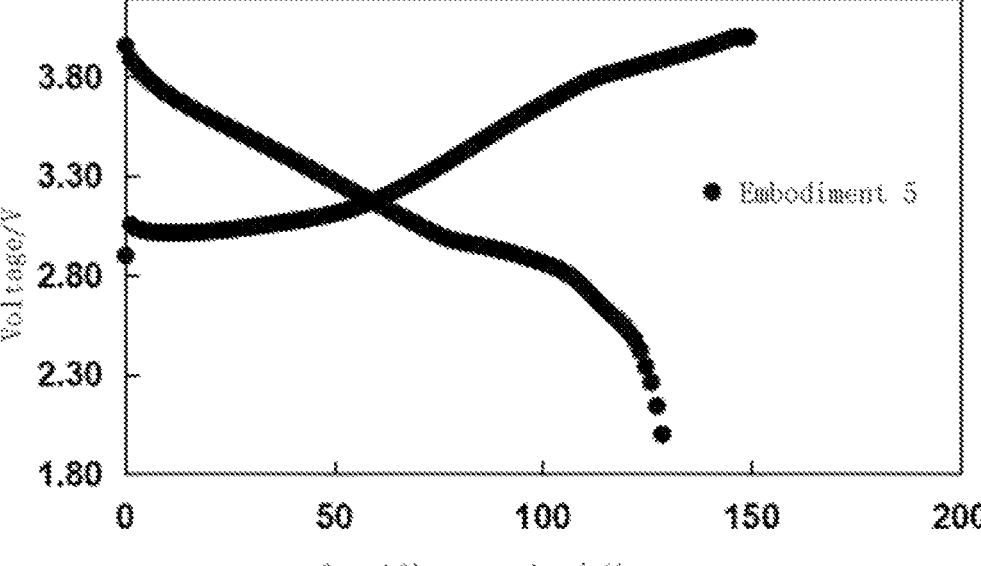
FIG. 10 is a charge-discharge graph of the sodium ion cathode material according to Example 5.

The cathode material is tested for particle size and specific surface area and has a D50 of 4.9 μm and a BET of 0.69 m²/g. Its surface residual alkali content is 2.95%. The diffraction peak and full width at half maxima, particle size D50, specific surface area, and amount of surface alkali remaining in the XRD graph of the cathode material are summarized in Table 2. A button battery is prepared from the cathode material and tested for capacity and rate. See Table 2 for details of the test data. The charge-discharge curve of 0.1 C/0.1 C at 4.0-2.0V is shown in FIG. 10.

Example 6

Manganese carbonate, nickel carbonate, ferrous oxalate, zinc oxide and copper sulfate were weighed for a corresponding amount in a molar ratio, Mn:Ni:Fe:Zn:Cu=0.3:0.31:0.27:0.1:0.02, measured according to the chemical formula, then added into a sand mill to sand 45 min to obtain a wet precursor. The wet precursor was spray-dried to obtain a precursor. The precursor was uniformly mixed with sodium chloride according to the stoichiometric ratio (Na:Mn:Ni:Fe:Zn:Cu=1.15:0.3:0.31:0.27:0.1:0.04) uniformly mixing according to a stoichiometric ratio. The uniformly mixed material was to a constant temperature of 880° C. at a heating rate of 5° C./min under an air atmosphere for 15 hours, then naturally cooled, pulverized and sieved to obtain a cathode material having a molecular formula of $Na_{1.15}Ni_{0.31}Mn_{0.3}Zn_{0.1}Fe_{0.27}Cu_{0.02}O_2$.

Figure 11:
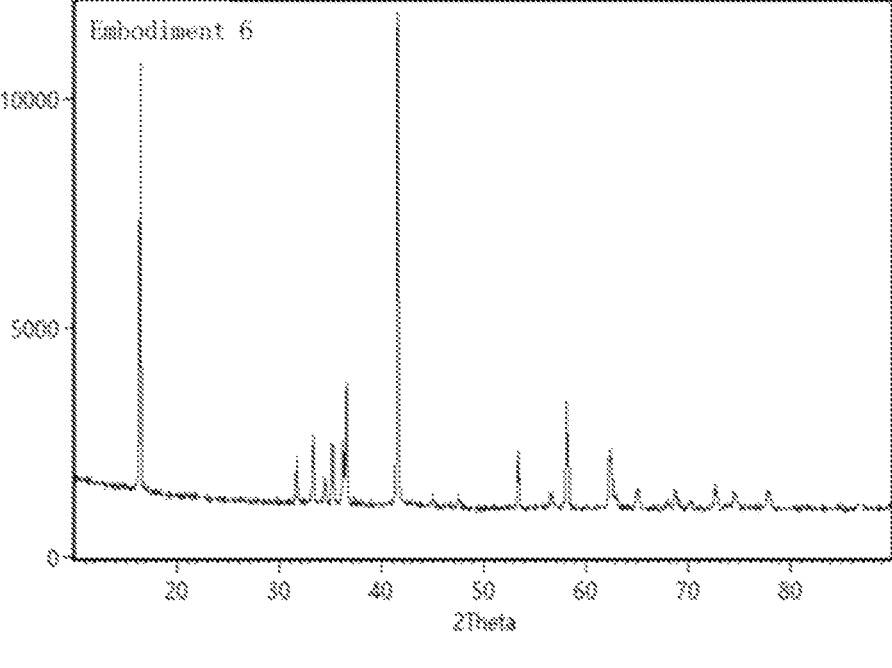
FIG. 11 is a XRD graph of the sodium ion cathode material according to Example 6.

FIG. 11 shows the XRD graph of the cathode material of this example. It can be seen from the figure that the diffraction peak at a diffraction angle 2θ of 16.4554° has a full width at half maxima FWHM of 0.132°, the diffraction peak being a minor strong peak; the diffraction peak at the diffraction angle 2θ of 31.718° has a full width at half maxima FWHM of 0.133°; the diffraction peak at the diffraction angle 2θ of 33.338° has a full width at half maxima FWHM of 0.158°; the diffraction peak at the diffraction angle 2θ of 34.411° has a full width at half maxima FWHM of 0.111°; the diffraction peak at the diffraction angle 2θ of 35.205° has a full width at half maxima FWHM of 0.169°; the diffraction peak at the diffraction angle 2θ of 36.221° has a full width at half maxima FWHM of 0.133°; the diffraction peak at the diffraction angle 2θ of 36.5471° has a full width at half maxima FWHM of 0.15°; the diffraction peak at the diffraction angle 2θ of 41.5489° has a full width at half maxima FWHM of 0.1221°, the diffraction peak being a major strong peak. The peak intensity ratio of a diffraction peak around a diffraction angle 2θ of 31.8° to a diffraction peak around a diffraction angle 2θ of 34.4° is 1.43:1. The peak intensity ratio of a diffraction peak around a diffraction angle 2θ of 36.3° to a diffraction peak around a diffraction angle 2θ of 34.4° is 2.2:1.

Figure 12:
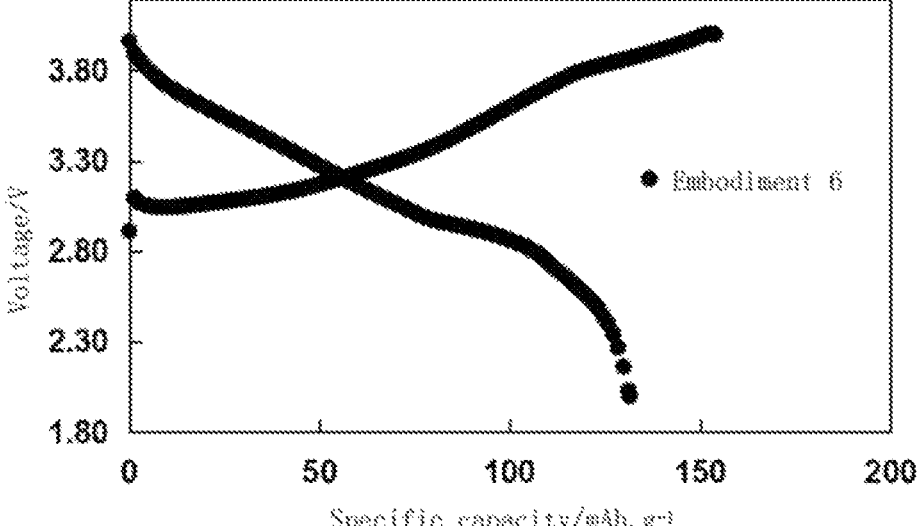
FIG. 12 is a charge-discharge graph of the sodium ion cathode material according to Example 6.

The cathode material is tested for particle size and specific surface area and has a D50 of 11.1 μm and a BET of 0.79 m²/g. Its surface residual alkali content is 3.15%. The diffraction peak and full width at half maxima, particle size D50, specific surface area, and amount of surface alkali remaining in the XRD graph of the cathode material are summarized in Table 2. A button battery is prepared from the cathode material and tested for capacity and rate. See Table 2 for details of the test data. The charge-discharge curve of 0.1 C/0.1 C at 4.0-2.0V is shown in FIG. 12.

Comparative Example 1

In comparison with Example 1, the zinc oxide therein is replaced with copper oxide, and the other preparation methods are the same as those in Example 1 to prepare a cathode material having a molecular formula of $Na_{0.87}Ni_{0.23}Mn_{0.33}Cu_{0.15}Fe_{0.29}O_2$.

Figure 13:
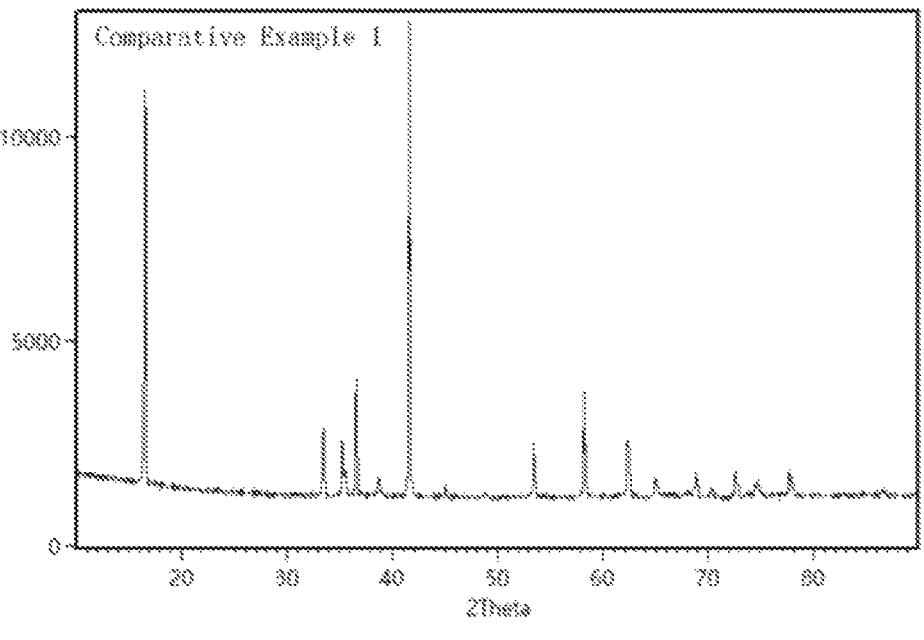
FIG. 13 is a XRD graph of a sodium ion cathode material according to Comparative Example 1.

FIG. 13 shows the XRD graph of the cathode material of this example. It can be seen from the figure that the diffraction peak at a diffraction angle 2θ of 16.52° has a full width at half maxima FWHM of 0.121°, the diffraction peak being a minor strong peak; the diffraction peak at the diffraction angle 2θ of 33.4° has a full width at half maxima FWHM of 0.149°; the diffraction peak at the diffraction angle 2θ of 35.2° has a full width at half maxima FWHM of 0.124°; the diffraction peak at the diffraction angle 2θ of 36.6° has a full width at half maxima FWHM of 0.115°; the diffraction peak at the diffraction angle 2θ of 38.7° has a full width at half maxima FWHM of 0.18°; the diffraction peak at the diffraction angle 2θ of 41.6° has a full width at half maxima FWHM of 0.089°, the diffraction peak being a major strong peak.

Figure 14:
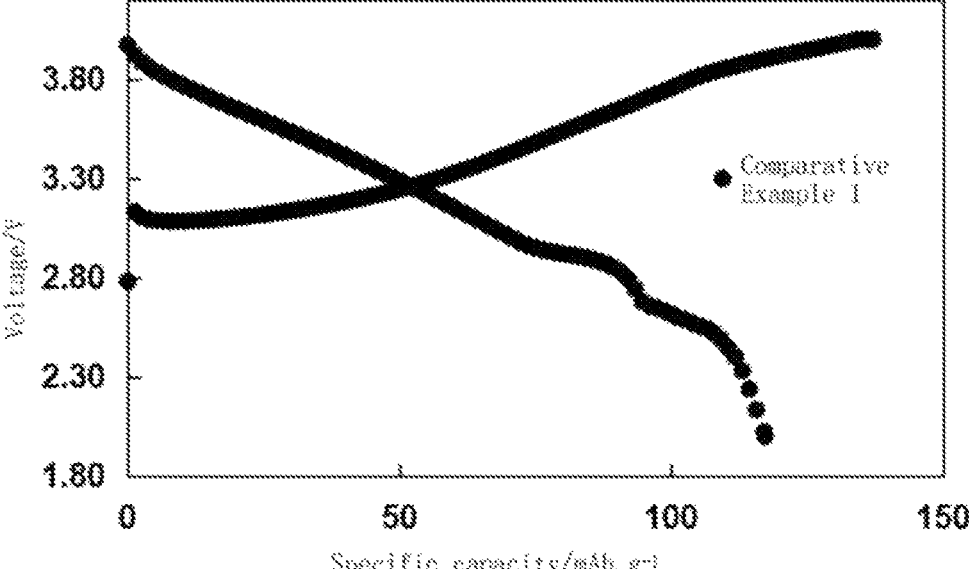
FIG. 14 is a charge-discharge graph of the sodium ion cathode material according to Comparative Example 1.

The cathode material is tested for the particle size and specific surface area and has a particle size D50 of 7.1 μm, a BET of 0.6 m²/g, and a content of residual alkali on the surface of 3.8%. The diffraction peak and full width at half maxima, particle size D50, specific surface area, and amount of surface alkali remaining in the XRD graph of the cathode material are summarized in Table 2. A button battery is prepared from the cathode material and tested for capacity and rate. See Table 2 for details of the test data. The charge-discharge curve of 0.1 C/0.1 C at 4.0-2.0V is shown in FIG. 14.

Comparative Example 2

Sodium carbonate, manganese trioxide, nickel oxide, ferrous oxalate, and calcium oxide were weighed for a corresponding amount in a molar ratio, Na:Mn:Ni:Fe:Ca=0.79:0.37:0.28:0.33:0.02, measured according to the chemical formula. Then the mixture was ball milled 30 Hz, 30 min for uniformly mixing. The uniformly mixed material was heated to a constant temperature of 860° C. at a heating rate of 7° C./min for 20 hours under an air atmosphere, and then naturally cooled, pulverized and sieved to obtain a cathode material having a molecular formula of $Na_{0.79}Ni_{0.28}Mn_{0.37}Fe_{0.33}Ca_{0.02}O_2$.

Figure 15:
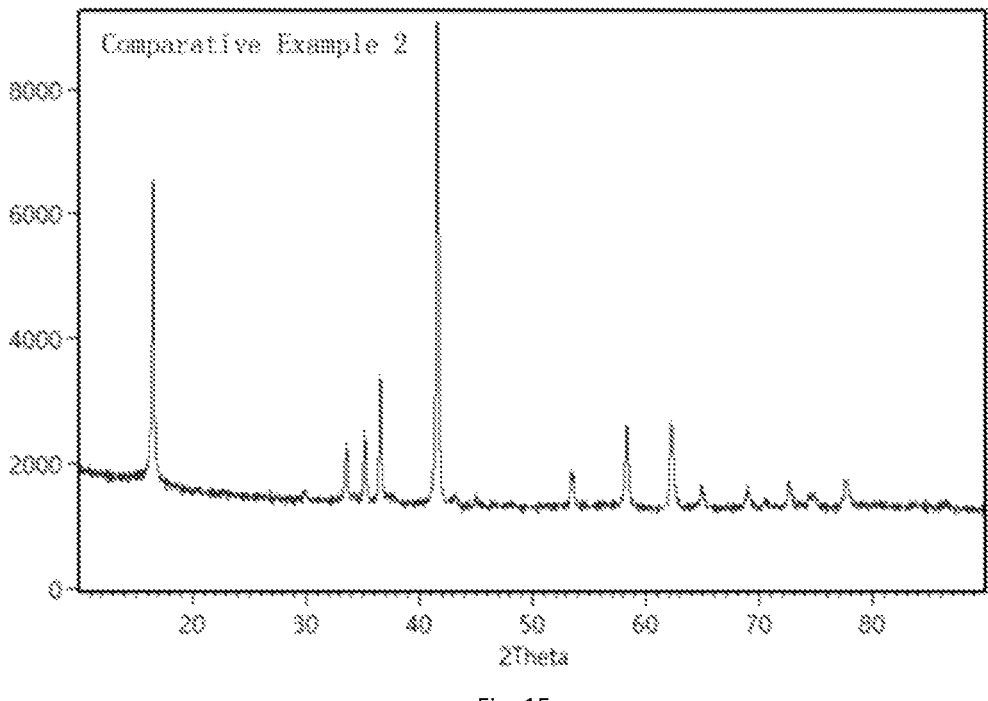
FIG. 15 is a XRD graph of the sodium ion cathode material according to Comparative Example 2.

FIG. 15 shows the XRD graph of the cathode material of this example. It can be seen from the figure that the diffraction peak at a diffraction angle 2θ of 16.5° has a full width at half maxima FWHM of 0.212°, the diffraction peak being a minor strong peak; the diffraction peak at the diffraction angle 2θ of 33.5° has a full width at half maxima FWHM of 0.2°; the diffraction peak at the diffraction angle 2θ of 34.2° has a full width at half maxima FWHM of 0.31°; the diffraction peak at the diffraction angle 2θ of 35.2° has a full width at half maxima FWHM of 0.203°; the diffraction peak at the diffraction angle 2θ of 41.5° has a full width at half maxima FWHM of 0.183°, the diffraction peak being a major strong peak.

Figure 16:
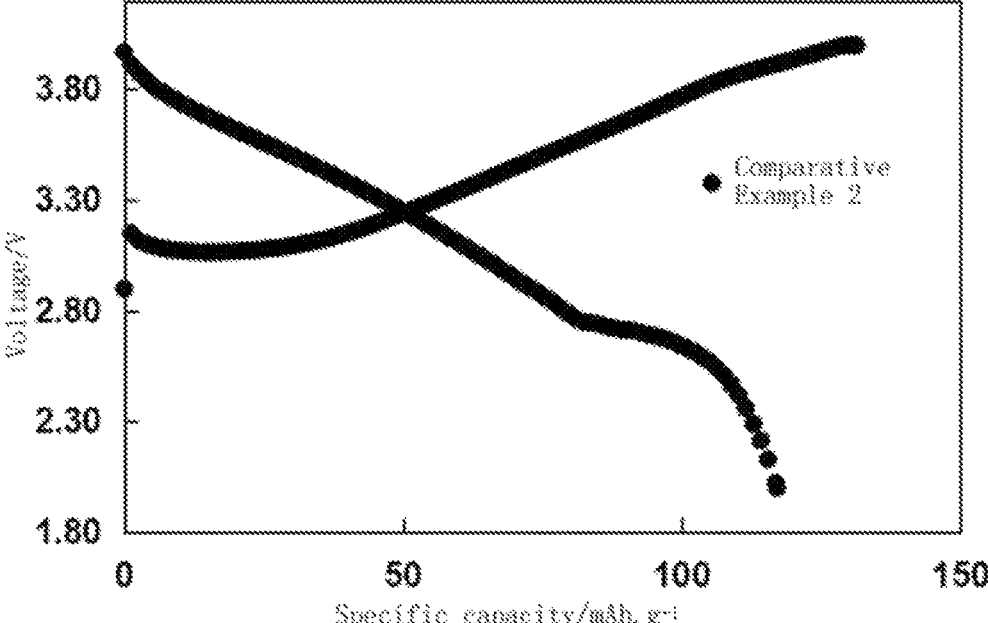
FIG. 16 is a charge-discharge graph of the sodium ion cathode material according to Comparative Example 2.

The cathode material is tested for the particle size and specific surface area and has a particle size D50 of 9.5 μm, a BET of 0.4 m²/g, and a content of residual alkali on the surface of 4.68%. The diffraction peak and full width at half maxima, particle size D50, specific surface area, and amount of surface alkali remaining in the XRD graph of the cathode material are summarized in Table 2. A button battery is prepared from the cathode material and tested for capacity and rate. See Table 2 for details of the test data. The charge-discharge curve of 0.1 C/0.1 C at 4.0-2.0V is shown in FIG. 16.

Comparative Example 3

Manganese carbonate, nickel carbonate, ferrous oxalate, zinc oxide and copper sulfate weighed for a corresponding amount in a molar ratio, Mn:Ni:Fe:Zn:Cu=0.26:0.21:0.24:0.25:0.04, according to the chemical formula, then added into a sand mill to sand 45 min to obtain a wet precursor. The wet precursor was spray-dried to obtain a precursor. The precursor was uniformly mixed with sodium chloride according to the stoichiometric ratio (Na:Mn:Ni:Fe:Zn:Cu=0.79:0.26:0.21:0.24:0.25:0.04) uniformly mixing according to a stoichiometric ratio. The uniformly mixed material was to a constant temperature of 880° C. at a heating rate of 5° C./min under an air atmosphere for 15 hours, then naturally cooled, pulverized and sieved to prepare a cathode material having a molecular formula of $Na_{0.79}Ni_{0.21}Mn_{0.26}Zn_{0.25}Fe_{0.24}Cu_{0.04}O_2$.

Figure 17:
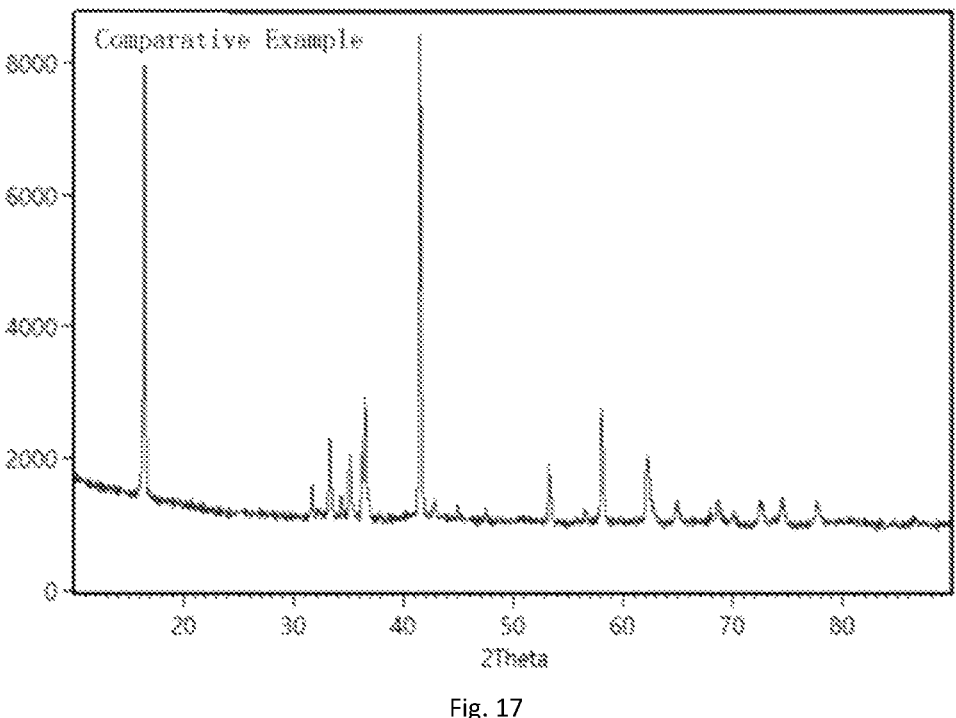
FIG. 17 is a XRD graph of the sodium ion cathode material according to Comparative Example 3.

FIG. 17 shows the XRD graph of the cathode material of this example. It can be seen from the figure that the diffraction peak at a diffraction angle 2θ of 16.432° has a full width at half maxima FWHM of 0.143°, the diffraction peak being a minor strong peak; the diffraction peak at the diffraction angle 2θ of 31.695° has a full width at half maxima FWHM of 0.098°; the diffraction peak at the diffraction angle 2θ of 32.26° has a full width at half maxima FWHM of 0.19°; the diffraction peak at the diffraction angle 2θ of 33.333° has a full width at half maxima FWHM of 0.169°; the diffraction peak at the diffraction angle 2θ of 34.362° has a full width at half maxima FWHM of 0.089°; the diffraction peak at the diffraction angle 2θ of 35.145° has a full width at half maxima FWHM of 0.143°; the diffraction peak at the diffraction angle 2θ of 36.187° has a full width at half maxima FWHM of 0.089°; the diffraction peak at the diffraction angle 2θ of 36.4908° has a full width at half maxima FWHM of 0.148°; the diffraction peak at the diffraction angle 2θ of 37.833° has a full width at half maxima FWHM of 0.06°; the diffraction peak at the diffraction angle 2θ of 41.4908° has a full width at half maxima FWHM of 0.1213°, the diffraction peak being a major strong peak. The peak intensity ratio of a diffraction peak around a diffraction angle 2θ of 31.8° to a diffraction peak around a diffraction angle 2θ of 34.4° is 1.3:1. The peak intensity ratio of a diffraction peak around a diffraction angle 2θ of 36.3° to a diffraction peak around a diffraction angle 2θ of 34.4° is 3.88:1.

Figure 18:
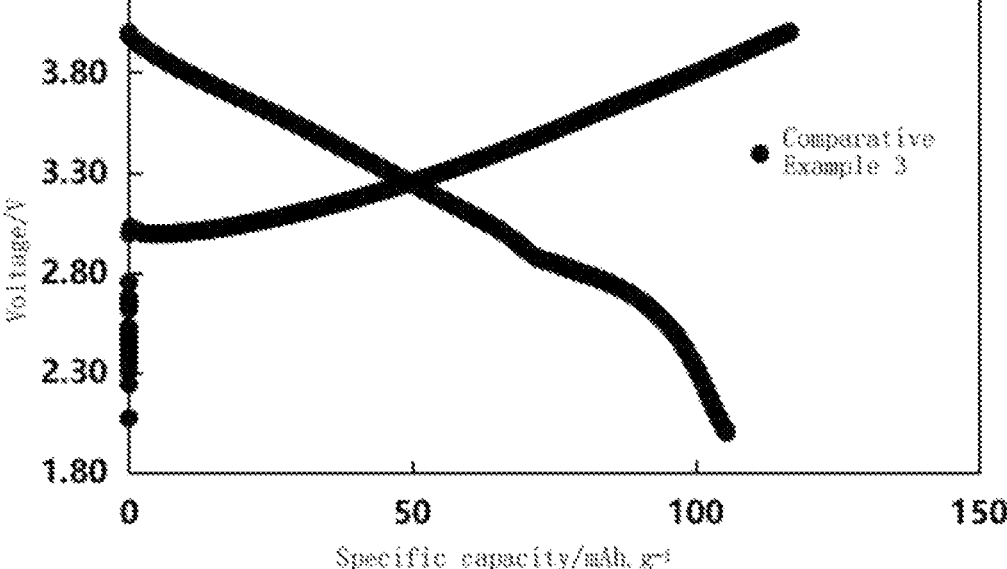
FIG. 18 is a charge-discharge graph of the sodium ion cathode material according to Comparative Example 3.

The cathode material is tested for particle size and specific surface area and has a D50 of 6.9 μm and a BET of 0.67 m²/g. Its surface residual alkali content is 4.13%. The diffraction peak and full width at half maxima, particle size D50, specific surface area, and amount of surface alkali remaining in the XRD graph of the cathode material are summarized in Table 3. A button battery is prepared from the cathode material and tested for capacity and rate. See Table 3 for details of the test data. The charge-discharge curve of 0.1 C/0.1 C at 4.0-2.0V is shown in FIG. 18.

TABLE 1

Properties of the cathode materials obtained in Examples 1 to 4

| | Example 1 | | Example 2 | | Example 3 | | Example 4 | |
|---|---|---|---|---|---|---|---|---|
| XRD parameters | Diffraction angle ° | Full width at half maxima ° | Diffraction angle ° | Full width at half maxima ° | Diffraction angle ° | Full width at half maxima ° | Diffraction angle ° | Full width at half maxima ° |
| | 16.5 | 0.128 | 16.5 | 0.125 | 16.5 | 0.13 | 16.6 | 0.121 |
| | 31.8 | 0.076 | 31.8 | 0.064 | 31.8 | 0.074 | 31.8 | 0.106 |
| | 33.4 | 0.148 | 33.4 | 0.137 | 33.4 | 0.163 | 33.5 | 0.147 |
| | 34.5 | 0.083 | 34.4 | 0.08 | 34.5 | 0.077 | 34.5 | 0.078 |
| | 35.2 | 0.154 | 35.2 | 0.145 | 35.2 | 0.16 | 35.2 | 0.147 |
| | 36.3 | 0.074 | 36.3 | 0.068 | 36.3 | 0.073 | 36.3 | 0.082 |
| | 36.6 | 0.135 | 36.6 | 0.135 | 36.6 | 0.143 | 36.5 | 0.134 |
| | 41.6 | 0.112 | 41.6 | 0.110 | 41.6 | 0.110 | 41.6 | 0.108 |
| Particle size D50 (μm) | 4.9 | | 5.0 | | 5.3 | | 7.5 | |
| Specific surface area (m²/g) | 1.20 | | 0.97 | | 0.94 | | 0.43 | |
| Residual alkali content (%) | 1.25 | | 0.78 | | 2.28 | | 2.21 | |
| 2.0-4.0 V 0.1 C Discharge capacity (mAh/g) | 129.8 | | 126.0 | | 130.5 | | 124.7 | |
| 2.0-4.0 V 1.0 C Discharge capacity (mAh/g) | 117.7 | | 110.3 | | 116.5 | | 108.0 | |
| 1.0 C/0.1 C rate | 90.68% | | 87.54% | | 89.27% | | 86.61% | |

TABLE 2

Properties of the cathode materials obtained in Examples 5 to 6 and Comparative Examples 1 to 2

| | Example 5 | | Example 6 | | Comparative Example 1 | | Comparative Example 2 | |
|---|---|---|---|---|---|---|---|---|
| XRD parameters | Diffraction angle ° | Full width at half maxima ° | Diffraction angle ° | Full width at half maxima ° | Diffraction angle ° | Full width at half maxima ° | Diffraction angle ° | Full width at half maxima ° |
| | 16.6 | 0.126 | 16.5 | 0.132 | 16.5 | 0.121 | 16.5 | 0.212 |
| | 31.8 | 0.091 | 31.7 | 0.133 | — | — | — | — |
| | 33.5 | 0.171 | 33.3 | 0.158 | 33.4 | 0.149 | 33.5 | 0.2 |
| | 34.4 | 0.083 | 34.4 | 0.111 | — | — | 34.2 | 0.31 |
| | 35.2 | 0.147 | 35.2 | 0.169 | 35.2 | 0.124 | 35.2 | 0.203 |
| | 36.3 | 0.088 | 36.2 | 0.133 | — | — | — | — |
| | 36.5 | 0.135 | 36.5 | 0.15 | 36.6 | 0.115 | — | — |
| | | | | | 38.7 | 0.18 | | |
| | 41.6 | 0.108 | 41.5 | 0.122 | 41.6 | 0.089 | 41.5 | 0.183 |
| Particle size D50 (μm) | 4.9 | | 11.1 | | 7.1 | | 9.5 | |
| Specific surface area (m²/g) | 0.69 | | 0.79 | | 0.6 | | 0.4 | |
| Residual alkali content (%) | 2.95 | | 3.15 | | 3.80 | | 4.68 | |
| 2.0-4.0 V 0.1 C Discharge capacity (mAh/g) | 128.7 | | 131.5 | | 116.0 | | 116.9 | |

TABLE 2-continued

| | Example 5 | Example 6 | Comparative Example 1 | Comparative Example 2 |
|---|---|---|---|---|
| 2.0-4.0 V 1.0 C Discharge capacity (mAh/g) | 114.3 | 115.5 | 89.1 | 89.1 |
| 1.0 C/0.1 C rate | 88.81% | 87.83% | 76.8% | 76.2% |

Properties of the cathode materials obtained in Examples 5 to 6 and Comparative Examples 1 to 2

TABLE 3

Properties of the cathode material obtained in Comparative Example

| | Comparative Example 3 | |
|---|---|---|
| | Diffraction angle° | Full width at half maxima° |
| XRD parameters | 16.4 | 0.143 |
| | 31.7 | 0.098 |
| | 32.3 | 0.19 |
| | 33.3 | 0.169 |
| | 34.4 | 0.089 |
| | 35.2 | 0.143 |
| | 36.2 | 0.089 |
| | 36.5 | 0.148 |
| | 37.8 | 0.06 |
| | 41.5 | 0.121 |
| Particle size D50 (μm) | 6.9 | |
| Specific surface area (m²/g) | 0.67 | |
| Residual alkali content (%) | 4.13 | |
| 2.0-4.0 V 0.1 C Discharge capacity (mAh/g) | 107.9 | |
| 2.0-4.0 V 1.0 C Discharge capacity (mAh/g) | 78.3 | |
| 1.0 C/0.1 C rate | 72.57% | |

TABLE 4

Contents of each element in Examples and Comparative Examples

| | Example 1 | Example 2 | Example 3 | Example 4 | Example 5 | Example 6 | Comparative Example 3 |
|---|---|---|---|---|---|---|---|
| Zinc wt % | 8.9% | 13.0% | 12.8% | 12.7% | 7.4% | 4.5% | 12.90% |
| Nickel wt % | 12.3% | 11.9% | 11.5% | 11.4% | 15.4% | 15.7% | 14.30% |
| Manganese wt % | 16.5% | 15.2% | 14.8% | 15.0% | 13.4% | 14.2% | 13.00% |
| Iron wt % | 14.8% | 13.9% | 14.0% | 14.0% | 13.2% | 13.0% | 11.90% | has four diffraction peaks between the diffraction angle $2\theta$ values of 30° and 40°. The content of residual alkali in the cathode material prepared in Comparative example 1 is much higher than that in Example 1, and the capacity of the material is also much lower than that in Example 1. The rate capability of the material is also worse than that in Example 1.

The same preparation method is adopted by Comparative example 2 as in Example 3, except that no new element is added, and the XRD graph thereof has three diffraction peaks between the diffraction angle $2\theta$ values of 30° and 40°. The content of residual alkali in the cathode material prepared in Comparative example 2 is much higher than that in Example 3. Since the content of Ni element in the material is relatively high, the theoretical capacity should be high. However, the actual capacity is much lower than that in Example 3, and the rate capability of the material is also worse than that in Example 3.

The same preparation method is adopted by Comparative example 2 as in Example 3, except that the addition amount of zinc element is beyond the scope of protection claimed in the present invention, and the XRD graph of the obtained cathode material has 8 diffraction peaks between the diffraction angle $2\theta$ values of 30° and 40°. Two more impurity It can be obtained from the table above that the content of zinc in the cathode material prepared in Examples 1-6 is within the claimed range of the present invention. The XRD graph of the cathode material has six diffraction peaks between the diffraction angle $2\theta$ values of 30° and 40°. The full width at half maxima of the diffraction peak is 0.04°-0.18°. The cathode material has a stable structure, a high discharge capacity of 0.1 C and good rate capability. In addition, the residual alkali contents of the cathode materials prepared in Examples 1 to 6 are relatively low and may be controlled within 3.5%. In particular, the residual alkali contents of Examples 1 to 4 may be controlled within 2.3%.

The same preparation method is adopted by Comparative example 1 as in Example 1, except that zinc element is exchanged for copper element, and the XRD graph thereof peaks are in Comparative Example 2 compared with Example 6. It is speculated that the content of zinc element may be too high, and a part of zinc element forms a new solid solution with other elements, resulting in the material with a high residual alkali content, a low capacity and a poor rate capability.

The data above show that zinc is used to replace some rare and precious metals such as nickel, and the structural stability of the material is improved by adding zinc under the premise of not affecting the material performance. On the one hand, zinc and oxygen are mostly ionically bonded. More oxygen ions can be much easily captured in the presence of zinc ions, which provides more redox electric pairs, and effectively ensure the capacity performance of the material. On the other hand, the presence of zinc oxide can stabilize the crystal structure of the material. Especially during the charging and discharging process of a sodium ion battery, frequent de-intercalation of sodium ions and the presence of zinc oxide play a supporting role, which can effectively reduce the collapse of the material structure, provide vacancies for sodium ion intercalation and ensure the rate performance of the material.

The applicant states that the description above is only a specific example of the present invention, but the scope of protection of the present invention is not limited thereto. Those skilled in the art should understand that any changes and substitutions which can be easily made by those skilled in the art within the technical scope of the present invention disclosed are within the scope of protection and disclosure of the present invention.

The invention claimed is:

1. A cathode material for a sodium ion battery, characterized in that the cathode material has a chemical formula of $Na_{1+a}M_dZn_xO_{2+c}$, wherein $-0.40 \leq a \leq 0.25$, $0.78 < d \leq 0.93$, $0.1 < x \leq 0.22$, $-0.3 < c < 0.3$; M is one or a combination of two or more selected from the group consisting of Mn, Fe, Ni, Co, Al, Zr, Y, Ca, Li, Rb, Cs, W, Ce, Mo, Ba, Ti, Mg, Ta, Nb, V, Sc, Sr, B and Cu; one diffraction peak exists when a diffraction angle $2\theta$ is around $16°$, at least five diffraction peaks exist when the diffraction angle $2\theta$ is $30°$-$40°$, and one diffraction peak exists when the diffraction angle $2\theta$ is around $41°$.

2. The cathode material for the sodium ion battery according to claim 1, characterized in that in the cathode material $Na_{1+a}M_yZn_xO_{2+c}$ for the sodium ion battery, M contains an element A and an element B; the content of the element A is represented by b; the cathode material has a general chemical formula of $Na_{1+a}B_{1-b-x}Zn_xA_bO_{2+c}$, where $0.1 < x \leq 0.22$, $0.0 < b \leq 0.06$, $-0.40 \leq a \leq 0.25$, $-0.3 < c < 0.3$, $y = 1-x$; A and B are both one or a combination of two or more selected from the group consisting of Mn, Fe, Ni, Co, Al, Zr, Y, Ca, Li, Rb, Cs, W, Ce, Mo, Ba, Ti, Mg, Ta, Nb, V, Sc, Sr, B and Cu, and A and B may be the same or different.

3. The cathode material for the sodium ion battery according to claim 1, characterized in that the B element in the cathode material for the sodium ion battery is one or a combination of two or more selected from the group consisting of Mn, Fe, Ni and Co.

4. The cathode material for the sodium ion battery according to claim 1, characterized in that the cathode material for the sodium ion battery has a general chemical formula of $Na_{1+a}Ni_yMn_zFe_{1-x-y-z-b}Zn_xA_bO_{2+c}$, where $0.15 \leq y \leq 0.35$, $0.20 \leq z \leq 0.38$, $-0.40 \leq a \leq 0.25$, $0.0 < b \leq 0.06$, $-0.3 < c < 0.3$, $0.1 < x \leq 0.22$.

5. The cathode material for the sodium ion battery according to claim 1, characterized in that the content of zinc element in the cathode material for the sodium ion battery is 5.0%-20.0% by mass.

6. The cathode material for the sodium ion battery according to claim 1, characterized in that the content of zinc element in the cathode material for the sodium ion battery is 5.0%-15.0% by mass.

7. The cathode material for the sodium ion battery according to claim 1, characterized in that the cathode material powder for the sodium ion battery has an X-ray diffraction graph showing an $\alpha$-$NaFeO_4$ layered structure.

8. The cathode material for the sodium ion battery according to claim 1, characterized in that in a X-ray diffraction graph of the cathode material powder for the sodium ion battery, a full width at half maxima of the diffraction peak having a $2\theta$ value of $30°$-$40°$ is $0.04°$-$0.4°$.

9. The cathode material for the sodium ion battery according to claim 1, characterized in that in a X-ray diffraction graph of the cathode material powder for the sodium ion battery, a minor strong peak exists when $2\theta$ is around $16°$ and a major strong peak exists when $2\theta$ is around $41°$.

10. The cathode material for the sodium ion battery according to claim 1, characterized in that in a X-ray diffraction graph of the cathode material powder for the sodium ion battery, a full width at half maxima of the diffraction peak having a $2\theta$ of around $16°$ and around $41°$ is $0.05°$-$0.35°$.

11. The cathode material for the sodium ion battery according to claim 1, characterized in that, in a X-ray diffraction graph of the cathode material powder for the sodium ion battery, six diffraction peaks exist when $2\theta$ is $30°$-$40°$, where $2\theta$ is around $32°$, around $33°$, around $34°$, around $35°$, and around $36°$, respectively.

12. The cathode material for the sodium ion battery according to claim 1, characterized in that in a X-ray diffraction graph (XRD) of the cathode material powder for the sodium ion battery, a full width at half maxima FWHM of a diffraction peak around the diffraction angle $2\theta$ of $31.8°$ is $0.06°$-$0.25°$; a full width at half maxima FWHM of a diffraction peak around the diffraction angle $2\theta$ of $34.4°$ is $0.07°$-$0.25°$; a full width at half maxima FWHM of the diffraction peak around the diffraction angle $2\theta$ of $36.3°$ is $0.06°$-$0.25°$.

13. The cathode material for the sodium ion battery according to claim 1, characterized in that in a X-ray diffraction graph (XRD) of the cathode material powder for the sodium ion battery, the peak intensity ratio of the diffraction peak around the diffraction angle $2\theta$ of $31.8°$ to the diffraction peak around the diffraction angle $2\theta$ of $34.4°$ is (1-2):1.

14. The cathode material for the sodium ion battery according to claim 1, characterized in that in a X-ray diffraction graph (XRD) of the cathode material powder for the sodium ion battery, the peak intensity ratio of the diffraction peak around the diffraction angle $2\theta$ of $36.3°$ to the diffraction peak around the diffraction angle $2\theta$ of $34.4°$ is (2-3):1.

15. The cathode material for the sodium ion battery according to claim 1, characterized in that in the X-ray diffraction graph (XRD) of the cathode material powder for the sodium ion battery, a full width at half maxima FWHM of the diffraction peak around the diffraction angle satisfies one or more of the following conditions:

(a) a full width at half maxima FWHM of the diffraction peak around the diffraction angle $2\theta$ of $16.5°$ is $0.08°$-$0.25°$, (b) a full width at half maxima FWHM of the diffraction peak around the diffraction angle $2\theta$ of $33.4°$ is $0.08°$-$0.23°$, (c) a full width at half maxima FWHM of the diffraction peak around the diffraction angle $2\theta$ of $35.2°$ is $0.07°$-$0.22°$, (d) a full width at half maxima FWHM of the diffraction peak around the diffraction angle $2\theta$ of $36.6°$ is $0.08°$-$0.20°$, (e) a full width at half maxima FWHM of the diffraction peak around the diffraction angle $2\theta$ of $41.6°$ is $0.06°$-$0.20°$.

16. The cathode material for the sodium ion battery according to claim 1, characterized in that the cathode material for the sodium ion battery has a specific surface area of 0.25-1.5 $m^2/g$.

17. The cathode material for the sodium ion battery according to claim 1, characterized in that a particle size D50 of the cathode material for the sodium ion battery is 2-15 μm.

18. The cathode material for the sodium ion battery according to claim 1, characterized in that the cathode material for the sodium ion battery is prepared by a method comprising the following steps:

either (i) mixing an M source and a Zn source in a certain proportion to obtain a precursor, mixing the precursor uniformly with a Na source, or (ii) mixing the M source, the Zn source and the Na source uniformly, and after either step (i) or step (ii), then sintering at a temperature of 750-980° C. to obtain the cathode material for the sodium battery.

19. A positive electrode for a sodium ion battery, characterized by comprising the cathode material for the sodium ion battery according to claim 1 as a positive electrode active substance.

20. A sodium ion battery, characterized in that the sodium ion battery comprises the positive electrode for a sodium ion battery according to claim 19, a negative electrode, and an electrolyte containing a sodium salt.

* * * * *